United States Patent
Van Pelt et al.

(10) Patent No.: US 7,638,585 B2
(45) Date of Patent: Dec. 29, 2009

(54) CATALYST FLOW

(75) Inventors: Stephen L. Van Pelt, Pasadena, TX (US); Neiman T. Eaton, Pasadena, TX (US)

(73) Assignee: BASF Catalysts, LLC, Florham Park, NJ (US)

( * ) Notice: Subject to any disclaimer, the term of this patent is extended or adjusted under 35 U.S.C. 154(b) by 5 days.

(21) Appl. No.: 12/119,832

(22) Filed: May 13, 2008

(65) Prior Publication Data

US 2009/0286942 A1   Nov. 19, 2009

(51) Int. Cl.
   *C08F 4/42* (2006.01)
(52) U.S. Cl. .............. 526/124.6; 526/124.3; 526/124.2; 526/348; 502/103; 502/116; 502/118
(58) Field of Classification Search ............... 526/124.3, 526/124.2, 348, 124.6; 502/103, 116, 118
   See application file for complete search history.

(56) References Cited

U.S. PATENT DOCUMENTS

| | | | |
|---|---|---|---|
| 4,399,054 A | 8/1983 | Ferraris et al. | |
| 4,499,194 A | 2/1985 | Harada et al. | |
| 4,771,023 A | 9/1988 | Sasaki et al. | |
| 4,784,983 A | 11/1988 | Mao et al. | |
| 4,816,433 A | 3/1989 | Terano et al. | |
| 4,829,038 A | 5/1989 | Hoppin et al. | |
| 4,927,797 A | 5/1990 | Ewen | |
| 5,153,158 A | 10/1992 | Kioka et al. | |
| 5,177,043 A | 1/1993 | Koyama et al. | |
| 5,194,531 A | 3/1993 | Toda et al. | |
| 5,204,303 A | 4/1993 | Korvenoja et al. | |
| 5,221,651 A | 6/1993 | Sacchetti et al. | |
| 5,244,989 A | 9/1993 | Hara et al. | |
| 5,247,032 A | 9/1993 | Kioka et al. | |
| 5,346,972 A | 9/1994 | Duranel et al. | |
| 5,374,695 A | 12/1994 | Tanaglia | |
| 5,438,110 A | 8/1995 | Ishimaru et al. | |
| 5,459,116 A | 10/1995 | Ro et al. | |
| 5,489,634 A | 2/1996 | Hara et al. | |
| 5,500,396 A | 3/1996 | Martin | |
| 5,523,358 A | 6/1996 | Hirose et al. | |
| 5,576,259 A | 11/1996 | Hasegawa et al. | |
| 5,604,170 A | 2/1997 | Sano et al. | |
| 5,684,173 A | 11/1997 | Hosaka et al. | |
| 5,767,215 A | 6/1998 | Garoff et al. | |
| 5,773,537 A | 6/1998 | Mueller et al. | |
| 5,780,562 A | 7/1998 | Shimizu et al. | |
| 5,817,590 A | 10/1998 | Hasegawa et al. | |
| 5,844,046 A | 12/1998 | Ohgizawa et al. | |
| 5,905,050 A | 5/1999 | Koshinen et al. | |
| 5,955,396 A | 9/1999 | Lee et al. | |
| 5,965,478 A | 10/1999 | Goto et al. | |
| 6,054,542 A | 4/2000 | Kojoh et al. | |
| 6,075,151 A | 6/2000 | Hauser et al. | |
| 6,127,304 A | 10/2000 | Sacchetti et al. | |
| 6,291,385 B1 | 9/2001 | Lee et al. | |
| 6,323,152 B1 | 11/2001 | Sacchetti et al. | |
| 6,407,028 B1 | 6/2002 | Sacchetti et al. | |
| 6,417,132 B1 | 7/2002 | Rong et al. | |
| 6,437,061 B1 | 8/2002 | Sacchetti et al. | |
| 6,469,112 B2 | 10/2002 | Cheng et al. | |
| H2060 H | 3/2003 | Spencer et al. | |
| 6,627,710 B1 | 9/2003 | Sacchetti et al. | |
| 6,630,544 B1 | 10/2003 | Klendworth et al. | |
| 6,831,032 B2 | 12/2004 | Spaether | |
| 6,962,889 B2 * | 11/2005 | Zhu et al. | .................. 502/118 |
| 7,135,531 B2 | 11/2006 | Zhu et al. | |
| 7,153,803 B2 | 12/2006 | Zhu et al. | |
| 7,326,757 B2 | 2/2008 | Zhu et al. | |
| 2002/0035028 A1 | 3/2002 | Jing et al. | |
| 2003/0191215 A1 * | 10/2003 | Miller et al. | ................. 524/249 |

FOREIGN PATENT DOCUMENTS

| | | |
|---|---|---|
| EP | 0018737 | 11/1980 |
| EP | 0642537 | 10/1993 |
| EP | 0860452 | 8/1998 |
| EP | 1273595 | 1/2003 |
| JP | 5494590 | 7/1979 |
| JP | 3-140308 | 6/1991 |
| JP | 2001-114813 | 4/2001 |
| JP | 2001-114814 | 4/2001 |
| JP | 2001-114815 | 4/2001 |
| WO | 93-11164 | 6/1993 |

* cited by examiner

*Primary Examiner*—Ling-Siu Choi
(74) *Attorney, Agent, or Firm*—Cheng Q. Song

(57) ABSTRACT

Disclosed are catalyst systems and methods of making the catalyst systems/supports for the polymerization of an olefin containing a solid titanium catalyst component and an antistatic agent. Also disclosed are methods of making a polyolefin involving contacting an olefin with a catalyst system containing an antistatic agent. The use of the antistatic agent added to the catalyst system can improve flowability and/or dispersibility of the catalyst system.

20 Claims, 3 Drawing Sheets

CATALYST FLOW

TECHNICAL FIELD

The subject innovation generally relates to olefin polymerization Ziegler-Natta catalyst systems and methods of making the olefin polymers and copolymers.

BACKGROUND

Polyolefins are a class of polymers derived from simple olefins. Known methods of making polyolefins involve the use of Ziegler-Natta polymerization catalysts. These catalysts polymerize vinyl monomers using a transition metal halide to provide a stereoregulated polymer.

Numerous Ziegler-Natta polymerization catalysts exist. The catalysts have different characteristics and/or lead to the production of polyolefins having diverse properties. For example, certain catalysts have high activity while other catalysts have low activity, and similarly certain catalysts have a long life while other catalysts have a short life. Moreover, polyolefins made with the use of Ziegler-Natta polymerization catalysts vary in stereoregularity, molecular weight distribution, impact strength, melt-flowability, rigidity, heat sealability, isotacticity, and the like.

SUMMARY

The following presents a simplified summary of the innovation in order to provide a basic understanding of some aspects of the innovation. This summary is not an extensive overview of the innovation. It is intended to neither identify key or critical elements of the innovation nor delineate the scope of the innovation. Rather, the sole purpose of this summary is to present some concepts of the innovation in a simplified form as a prelude to the more detailed description that is presented hereinafter.

The subject innovation provides olefin polymerization catalyst systems methods of making the olefin polymerization catalyst systems, and methods of polymerizing (and copolymerizing) olefins involving the use of an antistatic agent added to the catalyst. The methods of making a polyolefin can involve contacting an olefin with a solid titanium catalyst containing an antistatic agent. Use of the antistatic agent can improve flowability and/or dispersibility of the solid titanium catalyst system.

To the accomplishment of the foregoing and related ends, the innovation contains the features hereinafter fully described and particularly pointed out in the claims. The following description and the annexed drawings set forth in detail certain illustrative aspects and implementations of the innovation. These are indicative, however, of but a few of the various ways in which the principles of the innovation may be employed. Other objects, advantages and novel features of the innovation will become apparent from the following detailed description of the innovation when considered in conjunction with the drawings.

DETAILED DESCRIPTION

Figure 1:
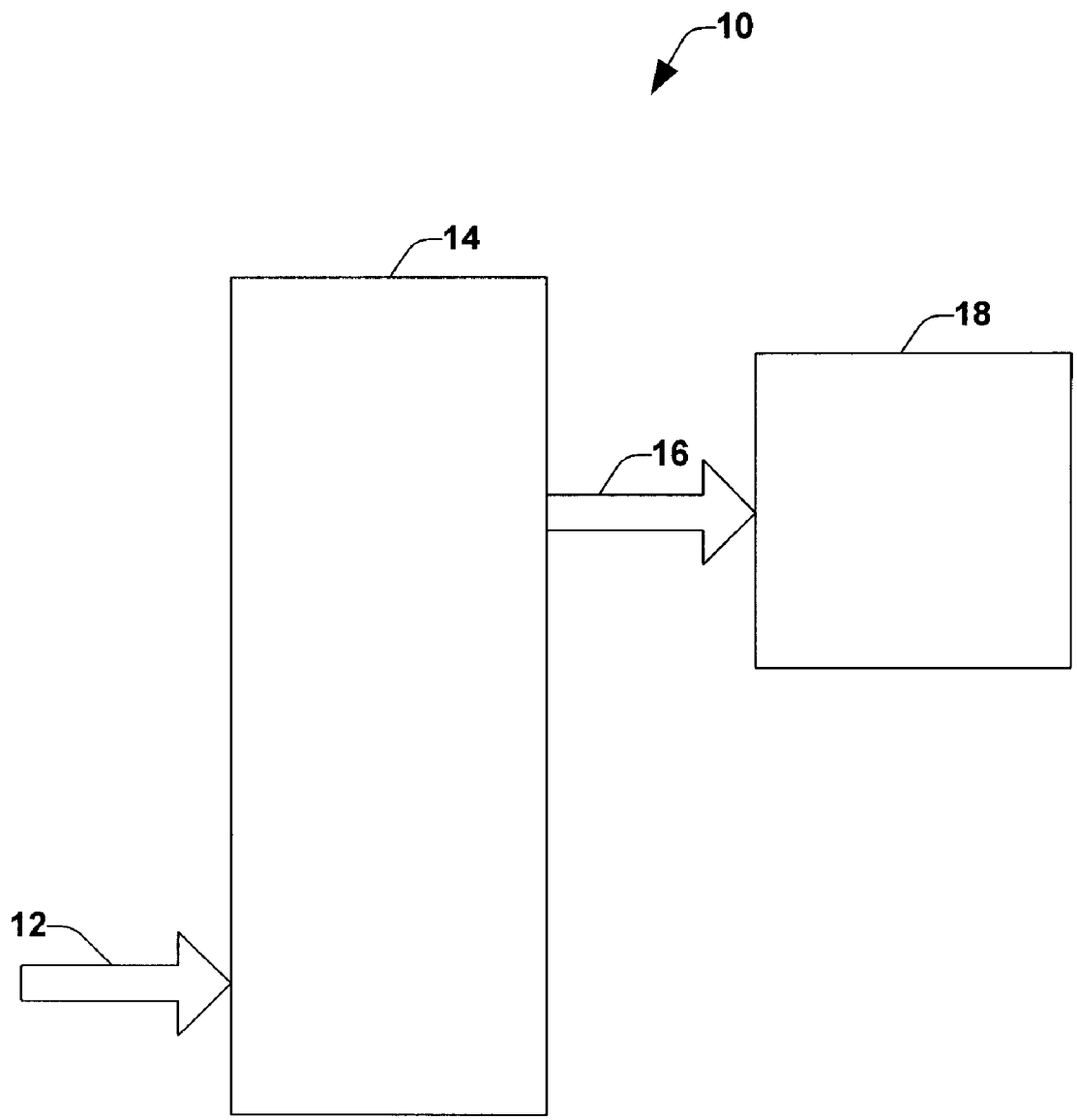
FIG. 1 is a high level schematic diagram of an olefin polymerization system in accordance with one aspect of the subject innovation.

The subject innovation relates to catalyst systems, methods of making catalyst systems, and methods of making polyolefins. An aspect of the innovation is a catalyst system for polymerizing an olefin containing a solid titanium catalyst component having a substantially spherical shape and a diameter from about 3 microns to about 150 microns (on a 50% by volume basis), the solid titanium catalyst component containing a titanium compound and a support made from a magnesium compound and an alkyl silicate; and an antistatic agent. In one embodiment, the catalyst system contains an organoaluminum compound having at least one aluminum-carbon bond and/or an organosilicon compound.

Use of the antistatic agent in the solid titanium catalyst can increase electrical conductivity of the particle surface of the solid titanium catalyst component, thus promoting particle discharging. The static charge of titanium catalyst component particles can be discharged preventing particles from sticking or clinging together. The use of the antistatic agent added to the catalyst can improve flowability and/or dispersibility of the catalyst. Consequently, the catalyst system can have the improved handling characteristics to facilitate manufacturing and/or using the catalyst system.

In one embodiment, the use of an antistatic agent added to a dry solid titanium catalyst can promote the flowability of the catalyst system. Addition of an antistatic agent to solid titanium catalyst systems can improve the consistency of dry catalyst discharge from a container (e.g., drum/cylinder packaging) enabling control of the amount of catalyst discharged over time.

In another embodiment, the use of an antistatic agent added to a dry or slurried solid titanium catalyst can promote the dispersibility of the catalysts, for example, during catalyst preparation prior to feeding the catalyst into the polymerization reactor. Solid titanium catalyst containing an antistatic agent can enhance separation of individual catalyst particles with normal agitation, thus improving catalyst measurement within a diluent due to the consistent dispersion.

In yet another embodiment, a solid titanium catalyst containing an antistatic agent used in a polymerization reactor can promote dispersibility of the catalysts in the reactor. In still yet another embodiment, a solid titanium catalyst containing an antistatic agent used in a polymerization reactor can facilitate a reduction in the static charge of polymer produced in the polymerization reactor. Addition of an antistatic agent can mitigate and/or prevent agglomeration of the polymers (e.g., polypropylene homopolymers, random copolymers of ethylene and propylene or other olefin). In another embodiment, the use of a solid titanium catalyst containing an antistatic agent in a polymerization reactor can reduce polymer fines since individual catalyst particles are capable of sufficient heat removal to prevent catalyst particle breakup.

Any suitable antistatic agent can be used in the subject innovation. General examples of antistatic agents include fatty acid esters, such as, e.g., butyl stearate; mono-hydroxy or poly-hydroxy alcohols, such as, e.g., glycerol; amines, such as, e.g., polyoxyethylene amines, hydroxylethyl alkylamines, ethoxylated tertiary alkylamines, fatty acid dialkanolamines; amides, such as, e.g., N,N-bis-(2-hydroxyethylstearamide); polyoxyethylenic or polyoxyalkylenic compounds, such as, e.g., a polyethylene glycol hexadecyl ether; ethylene oxide/propylene oxide copolymers; aminic soaps, such as, e.g., the stearic acid salt of octadecylamine; aminic salts of alkyl-sulfates; such as, e.g., the octadecylsulfate salt of guanidine; quaternary ammonium compounds, such as, e.g., octadecyl-trimethylammonium chloride; alkyl-phosphates, such as, e.g., bisdodecyl hydrogen phosphate; alkyphenol derivatives; and aminic salts of alkylphosphonic acids, such as, e.g., the octadecyl-phosphonic acid salt of triethanolamine, derivatives thereof, and the like. One or more antistatic agents can be used in any ratios.

Examples of commercially available antistatic agents include those under the trade designation Armostat® (such as Armostate® 300 (N,N-bis-(2-hydroxyethyl)-($C_{10}$-$C_{20}$)alkylamine), Armostate® 410 (bis(2-hydroxyethyl)cocoamine), and Armostat® 600 (N,N-bis(2-hydroxy-ethyl)alkylamine) from Akzo Nobel Corporation; those under the trade designation Atmer® 163 (N,N-Bis(2hydroxy-ethyl) alkylamine) from ICI Americas; those under the trade designation Expinne® 10 (dodecylbenzenesulfonic Acid) from Innospec Limited; those under the trade designation Octastat® 3000 (about 40-50% toluene, about 0-5% propan-2-ol, about 5-15% DINNSA (dinonyinaphthasulphonic acid), about 15-30% solvent naptha, about 1-10% trade secret polymer containing N, and about 10-20% trade secret polymer containing S) from Octel Performance Chemicals; those under the trade designation Kerostate® 8190 (about 10-20% alkenes (polymer with sulfur dioxide), about 3-8% benzenesulfonic acid (4-C10-13-sec-alkyl derivatives) and organic solvent from BASF, those under the trade designation Stadis® 450 (about 14 wt % of polybutene sulfate, about 3 wt % of aminoethanolepichlorohydrin polymer, about 13 wt % of alkylbenzenesulfonic acid, about 70 wt % of toluene and trace amounts of quaternary ammonium salt of aliphatic alkyl and propyl alcohol) from E.I. Du Pont de Nemours & Co.; and the like.

An antistatic agent is combined with a solid titanium catalyst before the catalyst is shipped. An antistatic agent is combined with a solid titanium catalyst component.

The titanium catalyst containing the antistatic agent can be in any suitable form. In one embodiment, a catalyst containing the antistatic agent is in a dry (e.g., solid or powder) form. In another embodiment, a catalyst containing the antistatic agent is in a slurry form. The slurry catalyst can contain liquid and a catalyst system with any suitable solids concentration. In one embodiment, the slurry catalyst contains a catalyst with about 3 wt % or more and about 40 wt % or less. In another embodiment, the slurry catalyst contains a catalyst with about 5 wt % or more and about 35 wt % or less. In one embodiment, the slurry catalyst contains a catalyst with about 10 wt % or more and about 30 wt % or less.

The slurry catalyst system can contain any suitable liquid such as inert hydrocarbon medium. Examples of inert hydrocarbon media include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures thereof. The slurry medium is typically hexane, heptane or mineral oil.

The catalyst can contain an antistatic agent at any suitable concentration. In one embodiment, a catalyst system in a dry form contains from about 5 ppm to about 3000 ppm of an antistatic agent based on the weight of the dry solid titanium catalyst or based on the weight of the slurry catalyst. In another embodiment, a solid titanium catalyst in a dry form contains from about 20 ppm to about 400 ppm of an antistatic agent based on the weight of the dry catalyst or based on the weight of the slurry catalyst. In yet another embodiment, a solid titanium catalyst in a dry form contains from about 25 ppm to about 1000 ppm of an antistatic agent based on the weight of the dry solid titanium catalyst or based on the weight of the slurry catalyst. In still yet another embodiment, a solid titanium catalyst in a dry form contains from about 700 ppm to about 1000 ppm of an antistatic agent based on the weight of the dry solid titanium catalyst or based on the weight of the slurry catalyst.

The catalyst system can be used in polymerization of olefins in any suitable system/process. Examples of systems for polymerizing olefins are now described. Referring to FIG. 1, a high level schematic diagram of a system 10 for polymerizing olefins is shown. Inlet 12 is used to introduce into a reactor 14 catalyst system components, olefins, optional comonomers, hydrogen gas, fluid media, pH adjusters, surfactants, and any other additives. Although only one inlet is shown, many often are employed. Reactor 14 is any suitable vehicle that can polymerize olefins. Examples of reactors 14 include a single reactor, a series of two or more reactors, slurry reactors, fixed bed reactors, gas phase reactors, fluidized gas reactors, loop reactors, multizone circulating reactors, and the like. Once polymerization is complete, or as polyolefins are produced, the polymer product is removed from the reactor 14 via outlet 16 which leads to a collector 18. Collector 18 may include downstream processing, such as heating, extrusion, molding, and the like.

Figure 2:
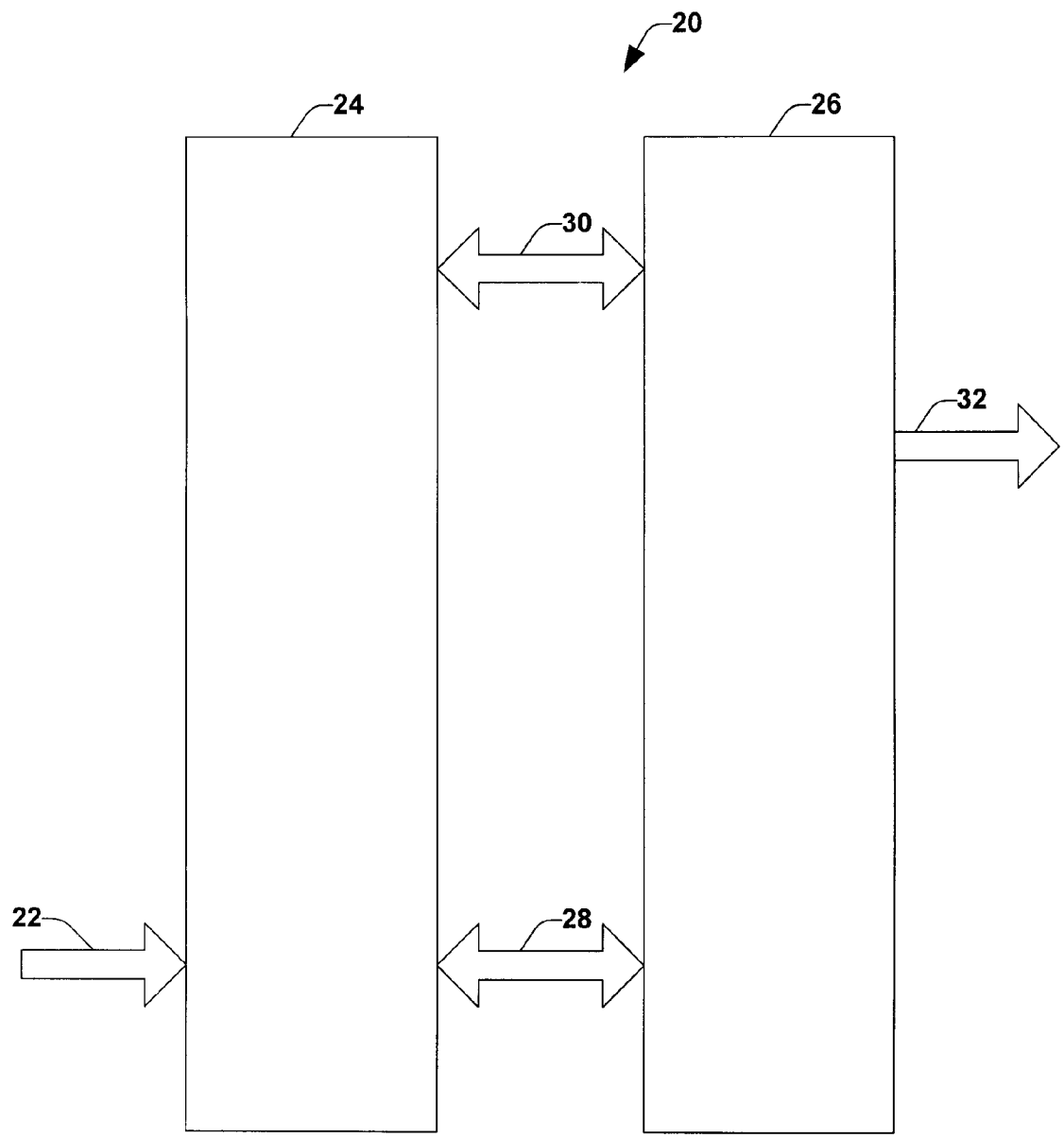
FIG. 2 is a schematic diagram of an olefin polymerization reactor in accordance with one aspect of the subject innovation.
Figure 3:
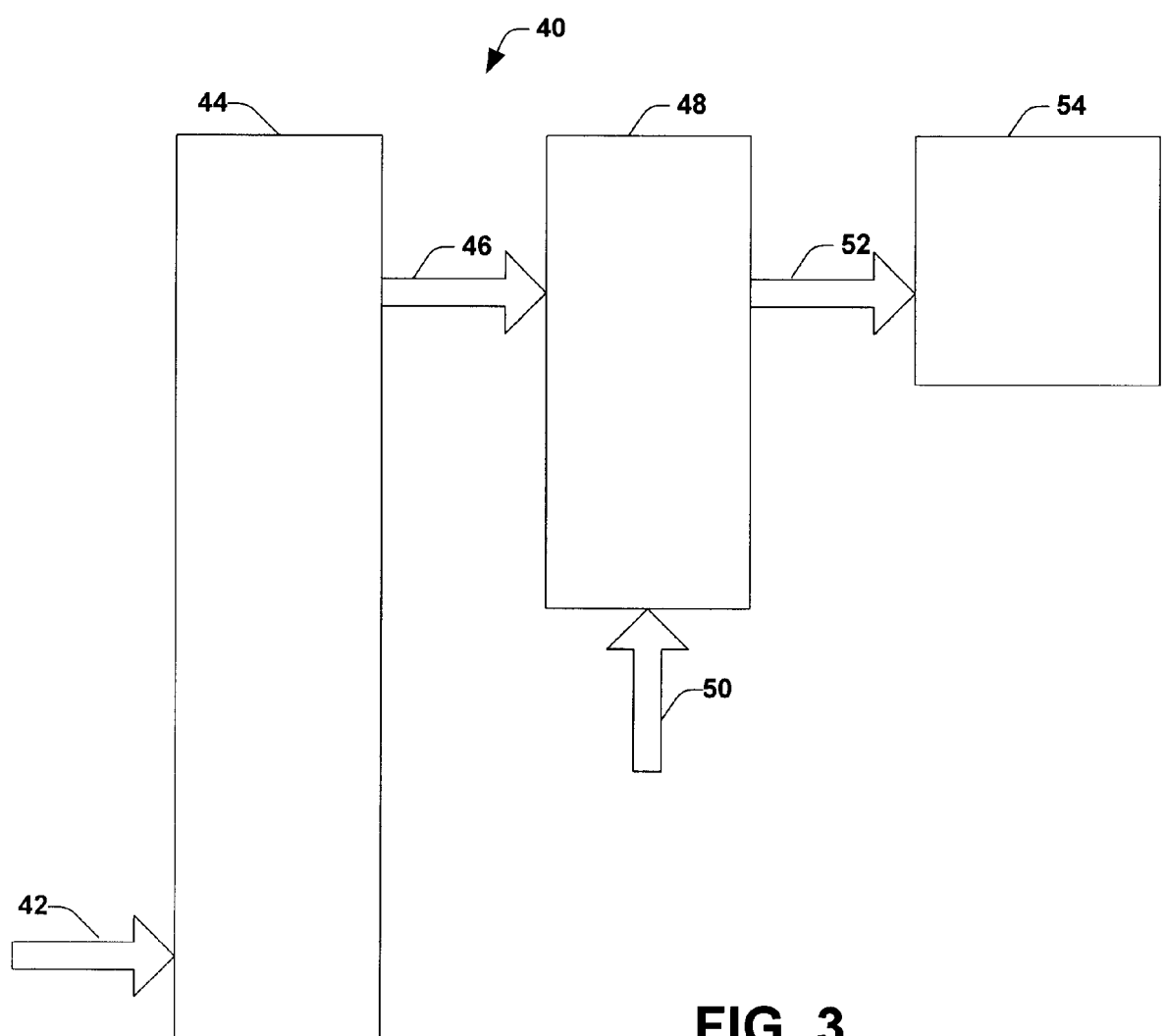
FIG. 3 is a high level schematic diagram of a system for making impact copolymer in accordance with one aspect of the subject innovation.

Referring to FIG. 2, a schematic diagram of a multizone circulating reactor 20 that can be employed as the reactor 14 in FIG. 1 or reactor 44 in FIG. 3 for making polyolefins. The multizone circulating reactor 20 substitutes a series of separate reactors with a single reactor loop that permits different gas phase polymerization conditions in the two sides due to use of a liquid barrier. In the multizone circulating reactor 20, a first zone starts out rich in olefin monomer, and optionally one or more comonomers. A second zone is rich in hydrogen gas, and a high velocity gas flow divides the growing resin particles out loosely. The two zones produce resins of different molecular weight and/or monomer composition. Polymer granules grow as they circulate around the loop, building up alternating layers of each polymer fraction in an onion like fashion. Each polymer particle constitutes an intimate combination of both polymer fractions.

In operation, the polymer particles pass up through the fluidizing gas in an ascending side 24 of the loop and come down through the liquid monomer on a descending side 26. The same or different monomers (and again optionally one or more comonomers) can be added in the two reactor legs. The reactor uses the catalyst systems described above.

In the liquid/gas separation zone 30, hydrogen gas is removed to cool and recirculate. Polymer granules are then packed into the top of the descending side 26, where they then descend. Monomers are introduced as liquids in this section. Conditions in the top of the descending side 26 can be varied with different combinations and/or proportions of monomers in successive passes.

Referring to FIG. 3, a high level schematic diagram of another system 40 for polymerizing olefins is shown. This system is ideally suited to make impact copolymer. A reactor 44, such as a single reactor, a series of reactors, or the multizone circulating reactor is paired with a gas phase or fluidized bed reactor 48 downstream containing the catalyst systems described above to make impact copolymers with desirable impact to stiffness balance or greater softness than are made with conventional catalyst systems. Inlet 42 is used to introduce into the reactor 44 catalyst system components, olefins, optional comonomers, hydrogen gas, fluid media, pH adjusters, surfactants, and any other additives. Although only one inlet is shown, many often are employed. Through transfer means 46 the polyolefin made in the first reactor 44 is sent to a second reactor 48. Feed 50 is used to introduce catalyst system components, olefins, optional comonomers, fluid media, and any other additives. The second reactor 48 may or may not contain catalyst system components. Again, although only one inlet is shown, many often are employed. Once the second polymerization is complete, or as impact copolymers are produced, the polymer product is removed from the second reactor 48 via outlet 52 which leads to a collector 54. Collector 54 may include downstream processing, such as heating, extrusion, molding, and the like. At least one of the first reactor 44 contains catalyst systems in accordance with the innovation.

When making an impact copolymer, polypropylene can be formed in the first reactor while an ethylene propylene rubber can be formed in the second reactor. In this polymerization, the ethylene propylene rubber in the second reactor is formed with the matrix (and particularly within the pores) of the polypropylene formed in the first reactor. Consequently, an intimate mixture of an impact copolymer is formed, wherein the polymer product appears as a single polymer product. Such an intimate mixture cannot be made by simply mixing a polypropylene product with an ethylene propylene rubber product.

Although not shown in any of the figures, the systems and reactors can be controlled, optionally with feedback based on continuous or intermittent testing, using a processor equipped with an optional memory and controllers. For example, a processor may be connected to one or more of the reactors, inlets, outlets, testing/measuring systems coupled with the reactors, and the like to monitor and/or control the polymerization process, based on preset data concerning the reactions, and/or based on testing/measuring data generated during a reaction. The controller may control valves, flow rates, the amounts of materials entering the systems, the conditions (temperature, reaction time, pH, etc.) of the reactions, and the like, as instructed by the processor. The processor may contain or be coupled to a memory that contains data concerning various aspects of the polymerization process and/or the systems involved in the polymerization process.

The subject innovation can be applied to any suitable Ziegler-Natta polymerization catalyst system. The details of the constituent, structure, and manufacture of the Ziegler-Natta polymerization catalyst system are not critical to the practice of the subject innovation. The details of the constituent, structure, and manufacture of the Ziegler-Natta polymerization catalyst system can be found in, for example, U.S. Patents and U.S. Patent Publications: U.S. Pat. Nos. 4,771,023; 4,784,983; 4,829,038; 4,861,847; 4,990,479; 5,177,043; 5,194,531; 5,244,989; 5,438,110; 5,489,634; 5,576,259; 5,767,215; 5,773,537; 5,905,050; 6,323,152; 6,437,061; 6,469,112; 6,962,889; 7,135,531; 7,153,803; 7,271,119; 2004242406; 2004/0242407; and 2007/0021573, which are hereby incorporated by reference in this regard.

Although the addition of an antistatic agent to catalyst system can be applied to any type of Ziegler-Natta polymerization catalyst system, the innovation is hereinafter illustrated and described in the context of an exemplary catalyst system containing a solid titanium catalyst component. Generally speaking, the magnesium based catalyst support can be made by contacting a magnesium compound and an alkyl silicate in an organic medium under elevated temperatures (above room temperature). When the magnesium compound is subsequently reconstituted, recrystallized, and/or recovered, it has a relatively large particle size and substantially spherical shape. In one embodiment, the magnesium based catalyst support is made by contacting at least one magnesium compound, an alcohol, an ether, a surfactant, and at least one alkyl silicate in an organic medium under elevated temperatures (above room temperature).

The magnesium compounds used in the preparation of the catalyst support and ultimately the solid titanium catalyst component include, for example, a magnesium compound having no reducibility. In one embodiment, the magnesium compound having no reducibility is a halogen containing magnesium compound. Specific examples of the magnesium compound having no reducibility include magnesium halides such as magnesium chloride, magnesium bromide, magnesium iodide and magnesium fluoride; alkoxy magnesium halides such as methoxy magnesium chloride, ethoxy magnesium chloride, isopropoxy magnesium chloride, butoxy magnesium chloride and octoxy magnesium chloride; aryloxy magnesium halides such as phenoxy magnesium chloride and methylphenoxy magnesium chloride; alkoxy magnesiums such as ethoxy magnesium, isopropoxy magnesium, butoxy magnesium, n-octoxy magnesium and 2-ethylhexoxy magnesium; aryloxy magnesiums such as phenoxy magnesium and dimethylphenoxy magnesium; and carboxylic acid salts of magnesium such as magnesium laurate and magnesium stearate. These magnesium compounds may be in the liquid or solid state.

In one aspect, halogen containing magnesium compounds, such as magnesium chloride, alkoxy magnesium chlorides and aryloxy magnesium chlorides, are preferred.

When the magnesium based catalyst support is made by using an alcohol, the alcohol can facilitate dissolving the magnesium compound to subsequently form the support by combining with the magnesium compound to provide an adduct. General examples of alcohols include primary alcohols, alkyl alcohols, alkenyl alcohols, and aromatic alcohols. In these general examples, the alkyl, alkenyl, aromatic groups contain from 1 to about 12 carbon atoms. In another embodiment, the alkyl, alkenyl, aromatic groups contain from about 2 to about 8 carbon atoms. Examples of alcohols include methanol, ethanol, n-propanol, isopropanol, n-butanol, iso-butanol, t-butanol, n-pentanol, iso-pentanol, hexanol, 2-ethylhexanol, cyclohexanol, and the like.

When the magnesium based catalyst support is made by using an ether, the ether can contribute to form relatively large catalyst supports. General examples of ethers include mono-oxygen ethers, glycol ethers, symmetrical mono-oxygen ethers, asymmetrical mono-oxygen ethers, polyethers, dialkyl ethers, diaromatic ethers, alkyl aromatic ethers. Generally speaking, the carbon groups attached to the oxygen atom, whether the group is alkyl, alkenyl, or aromatic, each independently contain from 1 to about 12 carbon atoms. That is, for example, in a dialkyl ether, each alkyl group independently contains from 1 to about 12 carbon atoms. In another embodiment, the carbon groups attached to the oxygen atom each independently contain from about 2 to about 8 carbon atoms.

Examples of mono-oxygen ethers include dimethyl ether, diethyl ether, dipropyl ether, diisopropyl ether, dibutyl ether, diisobutyl ether, di-t-butyl ether, dipentyl ether, diisoamyl ether, dihexyl ether, dicyclohexyl ether, diheptyl ether, dioctyl ethers, dibenzyl ether, methylethyl ether, methylpropyl ether, methylisopropyl ether, methylbutyl ether, methylisobutyl ether, methyl-t-butyl ether, methylpentyl ether, methylisoamyl ether, methylhexyl ethers, methylheptyl ethers, methyloctyl ethers, ethylpropyl ether, ethylisopropyl ether, ethylbutyl ether, ethylisobutyl ether, ethyl-t-butyl ether, ethylpentyl ether, ethylisoamyl ether, ethylhexyl ethers, ethylheptyl ethers, ethyloctyl ethers, propylisopropyl ether, propylbutyl ether, propylisobutyl ether, propyl-t-butyl ether, propylpentyl ether, propylisoamyl ether, propylhexyl ethers, propylheptyl ethers, propyloctyl ethers, isopropylbutyl ether, isopropylisobutyl ether, isopropyl-t-butyl ether, isopropylpentyl ether, isopropylisoamyl ether, isopropylhexyl ethers, isopropylheptyl ethers, isopropyloctyl ethers, butylisobutyl ether, butyl-t-butyl ether, butylpentyl ether, butylisoamyl ether, butylhexyl ethers, butylheptyl ethers, butyloctyl ethers, isobutyl-t-butyl ether, isobutylpentyl ether, isobutylisoamyl ether, isobutylhexyl ethers, isobutylheptyl ethers, isobutyloctyl ethers, t-butylpentyl ether, t-butylisoamyl ether, t-butylhexyl ethers, t-butylheptyl ethers, t-butyloctyl ethers, pentylisoamyl ether, pentylhexyl ethers, pentylheptyl ethers, pentyloctyl ethers, isoamylhexyl ethers, isoamylheptyl ethers, isoamyloctyl ethers, hexylheptyl ethers, hexyloctyl ethers, heptyloctyl ethers, and the like.

Examples of glycol ethers include alkylene glycol ethers and polyalkylene glycol ethers, such as poly(ethylene glycol) methyl ether, poly(ethylene glycol) ethyl ether, poly(ethylene glycol) propyl ether, poly(ethylene glycol) butyl ether, poly(propylene glycol) methyl ether, poly(propylene glycol) ethyl ether, poly(propylene glycol) propyl ether, and poly(propylene glycol) butyl ether. Other examples of glycol ethers include ethylene glycol methyl ether, ethylene glycol methylbutyl ether, ethylene glycol ethylbutyl ether, ethylene glycol ethyl ether, ethylene glycol butyl ether, ethylene glycol dimethyl ether, ethylene glycol diethyl ether, ethylene glycol dibutyl ether, propylene glycol methyl ether, propylene glycol ethyl ether, propylene glycol butyl ether, propylene glycol dimethyl ether, propylene glycol diethyl ether, propylene glycol dibutyl ether, di(ethylene glycol) methyl ether, di(ethylene glycol) ethyl ether, di(ethylene glycol) butyl ether, di(ethylene glycol) hexyl ether, di(ethylene glycol) dimethyl ether, di(ethylene glycol) diethyl ether, di(ethylene glycol) dibutyl ether, di(ethylene glycol) butylmethyl ether, di(ethylene glycol) dodecyl ether, di(propylene glycol) methyl ether, di(propylene glycol) butyl ether, tri(ethylene glycol) methyl ether, tri(ethylene glycol) dimethyl ether, tri(propylene glycol) methyl ether, and tri(propylene glycol) butyl ether.

Examples of polyethers include methoxy methoxy methane, methoxy ethoxy methane, ethoxy methoxy methane, ethoxy ethoxy methane, ethoxy ethoxy ethane, and the like.

When the magnesium based catalyst support is made by using a surfactant, the surfactant can contribute to form relatively large catalyst supports. General examples of surfactants include polymer surfactants, such as polyacrylates, polymethacrylates, polyalkyl methacrylates, and the like. A polyalkyl methacrylate is a polymer that may contain one or more methacrylate monomers, such as at least two different methacrylate monomers, at least three different methacrylate monomers, etc. Moreover, the acrylate and methacrylate polymers may contain monomers other than acrylate and methacrylate monomers, so long as the polymer surfactant contains at least about 40% by weight acrylate and methacrylate monomers.

Examples of monomers that be polymerized using known polymerization techniques into polymer surfactants include one or more of acrylate; tert-butyl acrylate; n-hexyl acrylate; methacrylate; methyl methacrylate; ethyl methacrylate; propyl methacrylate; isopropyl methacrylate; n-butyl methacrylate; t-butyl methacrylate; isobutyl methacrylate; pentyl methacrylate; isoamyl methacrylate; n-hexyl methacrylate; isodecyl methacrylate; lauryl methacrylate; stearyl methacrylate; isooctyl acrylate; lauryl acrylate; stearyl acrylate; cyclohexyl acrylate; cyclohexyl methacrylate; methoxy ethyl acrylate; isobenzyl acrylate; isodecyl acrylate; n-dodecyl acrylate; benzyl acrylate; isobornyl acrylate; isobornyl methacrylate; 2-hydroxyethyl acrylate; 2-hydroxypropyl acrylate; 2-methoxyethyl acrylate; 2-methoxybutyl acrylate; 2-(2-ethoxyethoxy)ethyl acrylate; 2-phenoxyethyl acrylate; tetrahydrofurfuryl acrylate; 2-(2-phenoxyethoxy)ethyl acrylate; methoxylated tripropylene glycol monoacrylate; 1,6-hexanediol diacrylate; ethylene glycol dimethacrylate; diethylene glycol dimethacrylate; triethylene glycol dimethacrylate; polyethylene glycol dimethacrylate; butylene glycol dimethacrylate; trimethylolpropane 3-ethoxylate triacrylate; 1,4-butanediol diacrylate; 1,9-nonanediol diacrylate; neopentyl glycol diacrylate; tripropylene glycol diacrylate; tetraethylene glycol diacrylate; heptapropylene glycol diacrylate; trimethylol propane triacrylate; ethoxylated trimethylol propane triacrylate; pentaerythritol triacrylate; trimethylolpropane trimethacrylate; tripropylene glycol diacrylate; pentaerythritol tetraacrylate; glyceryl propoxy triacrylate; tris(acryloyloxyethyl) phosphate; 1-acryloxy-3-methacryloxy glycerol; 2-methacryloxy-N-ethyl morpholine; and allyl methacrylate, and the like.

Examples of surfactants that are commercially available include those under the trade designation VISCOPLEX® available from RohMax Additives, GmbH, especially those having product designations 1-254, 1-256 and those under the trade designations CARBOPOL® and PEMULEN® available from Noveon/Lubrizol.

The surfactant is typically added in a mixture with an organic solvent. When added as a mixture with an organic solvent, the volume ratio of surfactant to organic solvent is from about 1:10 to about 2:1. In another embodiment, the volume ratio of surfactant to organic solvent is from about 1:6 to about 1:1. In yet another embodiment, the volume ratio of surfactant to organic solvent is from about 1:4 to about 1:2.

The alkyl silicate can directly contribute to form relatively large catalyst supports. General examples of alkyl silicates include tetraalkylorthosilicates, and the like. Examples of alkyl silicates include tetramethylorthosilicate, tetraethylorthosilicate, tetrapropylorthosilicate, tetrabutylorthosilicate, diethyldimethylorthosilicate, and the like.

The organic medium in which the magnesium compound and alkyl silicate are contacted include one or more organic solvents and/or organic liquids. Preferably the organic solvent is capable of permitting and facilitating the formation of an adduct from the magnesium compound and the alcohol. Examples of organic solvents include alkanes such as butane, pentane, hexane, heptane, octanes, cyclopentane, and cyclohexane; oxygen containing compounds such as alcohols and glycols; ketones; esters; ethers; and the like.

The magnesium compound, alkyl silicate, and organic medium can be combined in any order (all at once; the magnesium compound and the organic medium initially combined, followed by separate, semi-simultaneous, or simultaneous additions of the alkyl silicate; or the alkyl silicate and the organic medium initially combined, followed by addition of the magnesium compound). When the components are not added at the same time, the mixture as it is formed may be heated to discrete temperatures after adding some or all of the components (that is, between adding components).

The mixture of the magnesium compound, alkyl silicate, and organic medium (or any submixture containing less than all of these three components) may be heated above room temperature for a suitable amount of time. In one embodiment, the mixture or a submixture is heated to a temperature from about 40° C. to about 200° C. In another embodiment, the mixture or a submixture is heated to a temperature from about 50° C. to about 175° C. In yet another embodiment, the mixture or a submixture is heated to a temperature from about 75° C. to about 150° C. In one embodiment, the mixture or a submixture is heated for a period of time from about 5 minutes to about 15 hours. In another embodiment, the mixture or a submixture is heated for a period of time from about 10 minutes to about 10 hours.

The magnesium based catalyst support is recovered from the mixture by any suitable means, such as precipitation techniques. In one embodiment, however, the magnesium based catalyst support is not formed using spray drying. In another embodiment, the magnesium based catalyst support is not dealcoholed.

The solid titanium catalyst component used in subject innovation is a highly active catalyst component containing at least titanium, an internal electron donor, and a magnesium containing catalyst support made with an alkyl silicate.

The solid titanium catalyst component may be prepared by contacting a catalyst support made with a magnesium compound and an alkyl silicate, as described above, and a titanium compound. The titanium compound used in the preparation of the solid titanium catalyst component in the subject innovation is, for example, a tetravalent titanium compound represented by Formula (I)

$$Ti(OR)_g X_{4-g} \quad (I)$$

wherein each R independently represents a hydrocarbon group, preferably an alkyl group having 1 to about 4 carbon atoms, X represents a halogen atom, and $0 \leq g \leq 4$. Specific examples of the titanium compound include titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(O\ n\text{-}C_4H_9)Cl_3$, $Ti(OC_2H_5)Br_3$ and $Ti(O\ iso\text{-}C_4H_9)Br_3$; dialkoxytitanium dihalides such as $Ti(OCH_3)_2Cl_2$, $Ti(OC_2H_5)_2Cl_2$, $Ti(O\ n\text{-}C_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O\ n\text{-}C_4H_9)_3Cl$ and $Ti(OC_2H_5)_3Br$; and tetraalkoxytitaniums such as $Ti(OCH_3)_4$, $Ti(OC_2H_5)_4$ and $Ti(O\ n\text{-}C_4H_9)_4$.

Among these, the halogen containing titanium compounds, especially titanium tetrahalides, are preferred in some instances. These titanium compounds may be used individually or in a combination of two or more. They may be used as dilutions in hydrocarbon compounds or halogenated hydrocarbons.

When preparing the solid titanium catalyst component, an internal electron donor is used/added. Internal electron donors, for example, oxygen-containing electron donors such as alcohols, certain organosilicon compounds, phenols, ketones, aldehydes, carboxylic acids, organic or inorganic acid esters, ethers, acid amides and acid anhydrides, and nitrogen-containing electron donors such as ammonia, amines, nitriles and isocyanates. Specific examples include alcohols having 1 to about 18 carbon atoms which may have an alkyl group such as methanol, ethanol, propanol, pentanol, hexanol, octanol, 2-ethylhexanol, dodecanol, octadecyl alcohol, benzyl alcohol, phenylethyl alcohol, cumyl alcohol and isopropylbenzyl alcohol; phenols having 6 to about 25 carbon atoms such as phenol, resol, xylenol, ethylphenol, propylphenol, cumylphenol, nonylphenol and naphthol; ketones having about 3 to about 15 carbon atoms such as acetone, methyl ethyl ketone, methyl isobutyl ketone, acetophenone and benzophenone; aldehydes having 2 to 15 carbon atoms such as acetaldehyde, propionaldehyde, octylaldehyde, benzaldehyde, tolualdehyde and naphthaldehyde; organic acid esters having 2 to about 30 carbon atoms such as methyl formate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethyl cyclohexanecarboxylate, diethyl 1,2-cyclohexanedicarboxylate, di-2-ethylhexyl 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dipropyl phthalate, diisopropyl phthalate, dibutyl phthalate, diisobutyl phthalate, dioctyl phthalate, gamma-butyrolactone, delta-valerolactone, coumarine, phthalide and ethylene carbonate; inorganic acid esters such as ethyl silicate, butyl silicate, vinyltriethoxysilane, phenyltriethoxysilane and diphenyldiethoxysilane; acid halides having 2 to about 15 carbon atoms such as acetyl chloride, benzoyl chloride, tolyl chloride, anisoyl chloride and phthaloyl dichloride; ethers having 2 to about 20 carbon atoms such as methyl ether, ethyl ether, isopropyl ether, butyl ether, amyl ether, tetrahydrofuran, anisole and diphenyl ether; acid amides such as acetamide, benzamide and toluamide; acid anhydrides such as benzoic anhydride and phthalic anhydride, amines such as methylamine, ethylamine, diethylamine, tributylamine, piperidine, tribenzylamine, aniline, pyridine, picoline and tetramethylethylenediamine; and nitriles such as acetonitrile, benzonitrile and tolunitrile.

Esters may also be employed as internal electron donors for use with the titanium catalyst component. Examples of these esters are compounds represented by the following formulae

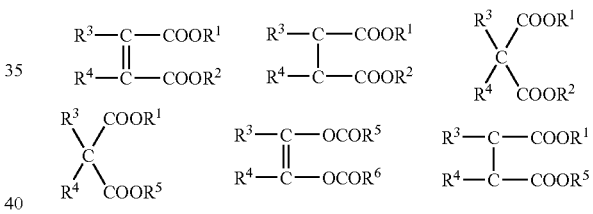

wherein $R^1$ represents a substituted or unsubstituted hydrocarbon group, and $R^2$, $R^5$ and $R^6$ represent a hydrogen atom or a substituted or unsubstituted hydrocarbon group, $R^3$ and $R^4$ represent a hydrogen atom or a substituted or unsubstituted hydrocarbon group, at least one of them is preferably a substituted or unsubstituted hydrocarbon group, and $R^3$ and $R^4$ may be linked to each other. In one embodiment, the substituted or unsubstituted hydrocarbon groups contain from 1 to about 30 carbon atoms.

Examples of the substituted hydrocarbon groups for $R^1$ through $R^5$ are hydrocarbon groups having groups containing hetero atoms such as N, O and S, for example, C—O—C, COOR, COOH, OH, $SO_3H$, —C—N—C— and $NH_2$. Especially preferred are diesters of dicarboxylic acids in which at least one of $R^1$ and $R^2$ is an alkyl group having at least about 2 carbon atoms.

Specific examples of polycarboxylic acid esters include aliphatic polycarboxylic acid esters such as diethyl succinate, dibutyl succinate, diethyl methylsuccinate, dipropylsuccinate, dipentylsuccinate, dihexylsuccinate, dioctylsuccinate, didecylsuccinate, butlyoctylsuccinate, didodecylsuccinate, and other alkylsuccinates, diisobutyl alpha-methylglutarate, dibutyl malonate, diethyl methylmalonate, diethyl ethylmalonate, diethyl isopropylmalonate, diethyl butyl malonate, diethyl phenylmalonate, diethyl diethylmalonate, diethyl allylmalonate, diethyl diisobutylmalonate, diethyl di-n-butylmalonate, dimethyl maleate, monooctyl maleate, dioctyl maleate, dibutyl maleate, dibutyl butylmaleate, diethyl butylmaleate, diisopropyl beta-methylglutarate, diallyl ethylsuccinate, di-2-ethylhexyl fumarate, diethyl itaconate, dibutyl itaconate, dioctyl citraconate and dimethyl citraconate; alicyclic polycarboxylic acid esters such as diethyl 1,2-cyclohexanecarboxylate, diisobutyl 1,2-cyclohexanecarboxylate, diethyl tetrahydrophthalate and Nadic acid, diethyl ester; aromatic polycarboxylic acid esters such as monoethyl phthalate, dimethyl phthalate, methylethyl phthalate, monoisobutyl phthalate, mono-n-butyl phthalate, diethyl phthalate, ethlisobutyl phthalate, ethyl-n-butyl phthalate, di-n-propyl phthalate, diisopropyl phthalate, di-n-butyl phthalate, diisobutyl phthalate, di-n-heptyl phthlate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthlenedicarboxylate, triethyl trimelliatate and dibutyl trimellitate; and heterocyclic polycarboxylic acid esters such as 3,4-furanedicarboxylic acid esters. Specific examples of the polyhydroxy compound esters may include 1,2-diacetoxybenzene, 1-methyl-2,3-d iacetoxybenzene, 2-methyl-2,3-diacetoxybenzene, 2,8-diacetoxynaphthalene, ethylene glycol dipivalate and butanediol pivalate. Specific examples of the hydroxy-substituted carboxylic acid esters are benzoylethyl salicylate, acetylisobutyl salicylate and acetylmethyl salicylate.

Long-chain dicarboxylic acid esters, such as diethyl adipate, diisobutyl adipate, diisopropyl sebacate, di-n-butyl sebacate, di-n-octyl sebacate and di-2-ethylhexyl sebacate, may also be used as the polycarboxylic acid esters that can be included in the titanium catalyst component. Among these polyfunctional esters, compounds having the skeletons given by the above general formulae are preferred. Also preferred are esters formed between phthalic acid, maleic acid or substituted malonic acid and alcohols having at least about 2 carbon atoms, diesters formed between phthalic acid and alcohols having at least about 2 carbon atoms are especially preferred.

Another group of internal electron donors that can be included in the titanium catalyst component are monocarboxylic acid esters represented by RCOOR' where R and R' are hydrocarboyl groups that may have a substituent, and at least one of them is a branched (including alicyclic) or ring-containing aliphatic group. Specifically, at least one of R and R' may be $(CH_3)_2CH-$, $C_2H_5CH(CH_3)-$, $(CH_3)_2CHCH_2-$, $(CH_3)_3C-$, $C_2H_5CH-$, $(CH_3)CH_2-$, cyclohexyl, methylbenzyl, para-xylyl, acrylic, and carbonylbenzyl. If either one of R and R' is any of the above-described group, the other may be the above group or another group such as a linear or cyclic group. Specific examples of the monocarboxylic acid esters include monoesters of dimethylacetic acid, trimethylacetic acid, alpha-methylbutyric acid, beta-methylbutyric acid, methacrylic acid and benzoylacetic acid; and monocarboxylic acid esters formed with alcohols such as methanol, ethanol, isopropanol, isobutanol and tert-butanol.

The internal electron donors may be used individually or in combination. In employing the internal electron donor, they do not have to be used directly as starting materials, but compounds convertible to the electron donors in the course of preparing the titanium catalyst components may also be used as the starting materials.

The solid titanium catalyst component may be formed by contacting the magnesium containing catalyst support, the titanium compound, and the internal electron donor by known methods used to prepare a highly active titanium catalyst component from a magnesium support, a titanium compound, and an electron donor.

Several examples of the method of producing the solid titanium catalyst component are briefly described below.

(1) The magnesium based catalytic support optionally with the internal electron donor, is reacted with the titanium compound in the liquid phase.

(2) The magnesium based catalytic support and the titanium compounds are reacted in the presence of the internal electron donor to precipitate a solid titanium complex.

(3) The reaction product obtained in (2) is further reacted with the titanium compound.

(4) The reaction product obtained in (1) or (2) is further reacted with the internal electron donor and the titanium compound.

(5) The product obtained in (1) to (4) is treated with a halogen, a halogen compound or an aromatic hydrocarbon.

(6) A magnesium based catalytic support is reacted with the optional internal electron donor, the titanium compound and/or a halogen-containing hydrocarbon.

(7) The magnesium based catalytic support is reacted with the titanium compound in the liquid phase, filtered and washed. The reaction product is further reacted with the internal electron donor and the titanium compound, then activated with additional titanium compound in an organic medium.

In embodiments of making the solid titanium catalyst component according to examples (2), (3), (4) and (5), the magnesium based catalytic support solution is mixed with liquid titanium tetrahalide to form a solid precipitate in the optional presence of an auxiliary precipitant. A polycarboxylic acid ester may be added before, during or after the precipitation of the solids and loaded on the solid.

The process of solids precipitation can be carried out by at least one of two methods. One method involves mixing liquid titanium tetrahalide with magnesium based catalytic support at a temperature in the range of about −40° C. to about 0° C., and precipitating the solids while the temperature is raised slowly to a range from about 30° C. to about 120° C., such as from about 60° C. to about 100° C. The other method involves adding liquid titanium tetrahalide dropwise into a magnesium based catalytic support solution at low or room temperature to precipitate out solids immediately. In both methods, an internal electron donor is desirably present in the reaction system. The internal electron donor can be added either after the magnesium based catalytic support solution is obtained or together with magnesium based catalytic support. Alternatively, two or more auxiliary precipitants can be added simultaneously.

To facilitate obtaining uniform solid particles, the process of precipitation can be carried out slowly. When the second method of adding titanium halide dropwise at low or room temperature is applied, the process may take place over a period from about 1 hour to about 6 hours. When the first method of raising the temperature in a slow manner is applied, the rate of temperature increase can range from about 4° C. to about 100° C. per hour.

The solid precipitate is first separated from the mixture. In the solid precipitate thus obtained may be entrained a variety of complexes and impurities, so that further treatment may in some instances be necessary.

The solid precipitate is washed with an inert diluent and then treated with titanium tetrahalide or a mixture of titanium tetrahalide and an inert diluent. The titanium tetrahalide used in this act is identical to or different with the titanium tetrahalide used in the second act. The amount of titanium tetrahalide used is from about 1 to about 20 moles, such as from about 2 to about 15 moles, per mole of magnesium halide in the support. The treatment temperature ranges from about 50° C. to about 150° C., such as from about 60° C. to about 100° C. If a mixture of titanium tetrahalide and inert diluent is used to treat the solid precipitate, the volume % of titanium tetrahalide in the treating solution is from about 10% to about 100%, the rest being an inert diluent.

The treated solids can be further washed with an inert diluent to remove ineffective titanium compounds and other impurities. The inert diluent herein used can be hexane, heptane, octane, 1,2-dichloroethane, benzene, toluene, xylenes, and other hydrocarbons.

In one embodiment, particularly embodiments following example (2) described above, the solid catalyst component has the following chemical composition: titanium, from about 1.5 to about 6.0 wt %; magnesium, from about 10 to about 20 wt %; halogen, from about 40 to about 70 wt %; internal electron donor, from about 1 to about 25 wt %; and optionally inert diluent from about 0 to about 15 wt %.

The amounts of the ingredients used in preparing the solid titanium catalyst component may vary depending upon the method of preparation. In one embodiment, from about 0.01 to about 5 moles of the internal electron donor and from about 0.01 to about 500 moles of the titanium compound are used per mole of the magnesium compound used to make the solid titanium catalyst component. In another embodiment, from about 0.05 to about 2 moles of the internal electron donor and from about 0.05 to about 300 moles of the titanium compound are used per mole of the magnesium compound used to make the solid titanium catalyst component.

In one embodiment, the size (diameter) of catalyst support particles formed in accordance with the subject innovation is from about 20 microns to about 150 microns (on a 50% by volume basis). In another embodiment, the size (diameter) of catalyst support particles is from about 25 microns to about 100 microns (on a 50% by volume basis). In yet another embodiment, the size (diameter) of catalyst support particles is from about 30 microns to about 80 microns (on a 50% by volume basis).

In one embodiment, in the solid titanium catalyst component, the atomic ratio of halogen/titanium is from about 4 to about 200; the internal electron donor/titanium mole ratio is from about 0.01 to about 10; and the magnesium/titanium atomic ratio is from about 1 to about 100. In another embodiment, in the solid titanium catalyst component, the atomic ratio of halogen/titanium is from about 5 to about 100; the internal electron donor/titanium mole ratio is from about 0.2 to about 6; and the magnesium/titanium atomic ratio is from about 2 to about 50.

The resulting solid titanium catalyst component generally contains a magnesium halide of a smaller crystal size than commercial magnesium halides and usually has a specific surface area of at least about 50 m$^2$/g, such as from about 60 to 1,000 m$^2$/g, or from about 100 to 800 m$^2$/g. Since, the above ingredients are unified to form an integral structure of the solid titanium catalyst component, the composition of the solid titanium catalyst component does not substantially change by washing with, for example, hexane.

The solid titanium catalyst component may be used after being diluted with an inorganic or organic compound such as a silicon compound, an aluminum compound. The subject innovation further relates to an olefin polymerization catalyst system containing an antistatic agent, and optionally an organoaluminum compound and or an organosilicon compound.

The catalyst system may contain at least one organoaluminum compound in addition to the solid titanium catalyst component. Compounds having at least one aluminum-carbon bond in the molecule can be used as the organoaluminum compound. Examples of organoaluminum compounds include compounds of the following Formulae (II) and (III).

$$R_m^{11}Al(OR^{12})_nH_pX_q^1 \quad \text{(II)}$$

In Formula (II), $R^{11}$ and $R^{12}$ may be identical or different, and each represent a hydrocarbon group usually having 1 to about 15 carbon atoms, preferably 1 to about 4 carbon atoms; $X^1$ represents a halogen atom, $0<3$, $0 \leq p \leq 3$, $0 \leq n \leq 3$, and $m+n+p+q=3$.

Organoaluminum compounds further include complex alkylated compounds between aluminum and a metal of Group I represented by Formula (III)

$$M^1AlR_4^{11} \quad \text{(III)}$$

wherein $M^1$ represents Li, Na or K, and $R^{11}$ is as defined above.

Examples of the organoaluminum compounds Formula (II) are as follows:

compounds of the general formula $R_m^{11}Al(OR^{12})_{3-m}$ wherein $R^{11}$ and $R^{12}$ are as defined, and m is preferably a number represented by $1.5 \leq m \leq 3$;

compounds of the general formula $R_m^{11}AlX_{3-m}$ wherein $R^{11}$ is as defined, $X^1$ is halogen, and m is preferably a number represented by $0 \leq m \leq 3$;

compounds of the general formula $R_m^{11}AlH_{3-m}$ wherein $R^{11}$ is as defined above, and m is preferably a number represented by $2 \leq m \leq 3$; and compounds represented by the general formula $R_m^{11}Al(OR^{12})_nX_q^1$ wherein $R^{11}$ and $R^{12}$ are as defined, $X^1$ is halogen, $0 \leq m \leq 3$, $0 \leq n \leq 3$, $0 \leq q \leq 3$, $m+n+q=3$.

Specific examples of the organoaluminum compounds represented by Formula (II) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having an average composition represented by $R_{2.5}^{11}Al(OR^{12})_{0.5}$; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums, for example alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; other partially hydrogenated alkyl aluminum, for example alkyl aluminum dihyrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide.

Organoaluminum compounds further include those similar to Formula (II) such as in which two or more aluminum atoms are bonded via an oxygen or nitrogen atom. Examples are $(C_2H_5)_2AlOAl(C_2H_5)_2$, $(C_4H_9)_2AlOAl(C_4H_9)_2$, $$(C_2H_5)_2AlNAl(C_2H_5)_2$$
$$|$$
$$C_2H_5$$

and methylaluminoxane.

Examples of organoaluminum compounds represented by Formula (III) include LiAl(C$_2$H$_5$)$_4$ and LiAl(C$_7$H$_{15}$)$_4$.

The organoaluminum compound catalyst component is used in the catalyst system of the subject innovation in an amount that the mole ratio of aluminum to titanium (from the solid catalyst component) is from about 5 to about 1,000. In another embodiment, the mole ratio of aluminum to titanium in the catalyst system is from about 10 to about 700. In yet another embodiment, the mole ratio of aluminum to titanium in the catalyst system is from about 25 to about 400.

The catalyst system may contain at least one organosilicon compound in addition to the solid titanium catalyst component. This organosilicon compound is sometimes termed an external electron donor. The organosilicon compound contains silicon having at least one hydrocarbon ligand (hydrocarbon group). General examples of hydrocarbon groups include alkyl groups, cycloalkyl groups, (cycloalkyl)methylene groups, alkene groups, aromatic groups, and the like.

The organosilicon compound, when used as an external electron donor serving as one component of a Ziegler-Natta catalyst system for olefin polymerization, contributes to the ability to obtain a polymer (at least a portion of which is polyolefin) having a broad molecular weight distribution and controllable crystallinity while retaining high performance with respect to catalytic activity and the yield of highly stereoregular polymer.

The organosilicon compound is used in the catalyst system in an amount that the mole ratio of the organoaluminum compound to the organosilicon compound is from about 2 to about 90. In another embodiment, the mole ratio of the organoaluminum compound to the organosilicon compound is from about 5 to about 70. In yet another embodiment, the mole ratio of the organoaluminum compound to the organosilicon compound is from about 7 to about 35.

In one embodiment, the organosilicon compound is represented by Formula (IV)

$$R_nSi(OR')_{4-n} \tag{IV}$$

wherein R and R' represent a hydrocarbon group, and n is 0≦n≦4. Specific examples of the organosilicon compound of Formula (IV) include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyidimethoxysilane, bis-m-tolyldimethoxysilane, bis-p-tolyidimethoxysilane, bis-p-totyidiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norboranetriethoxysilane, 2-norbornanemethyldimethoxysilane, ethyl silicate, butyl silicate, trimethylphenoxysilane, methyltriallyloxysilane, vinyltris(beta-methoxyethoxysilane), vinyltriacetoxysilane, and dimethyltetraethoxydisiloxane.

In one embodiment, the organosilicon compound contains in its structure a (cycloalkyl)methylene group, or a derivative of any one of these groups may be used, such as a norpinanes and pinanes. In one embodiment, the organosilicon compound contains one (cycloalkyl)methylene moiety. In another embodiment, the organosilicon compound contains two (cycloalkyl)methylene moieties that are the same or different.

Organosilicon compounds containing at least one (cycloalkyl)methylene moiety can be represented by Formula (V):

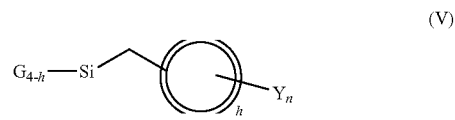

(V)

wherein the circle represents one or more cycloalkyl moieties, each G is independently an alkoxy group including methoxy and ethoxy groups or a hydrocarbon group including alkyl groups, such as methyl, ethyl, propyl, butyl, cyclopropyl, cyclopentyl, cyclohexyl, and 2-ethylhexyl groups; h is 1 to 4 or 1 to 2; each Y is independently a hydrocarbon group including those mentioned above, hydroxy, or halogen; and n is 0 to 3, 0 to 2, or 1 to 2. The alkoxy, alkyl, and hydrocarbon groups typically contain 1 to about 8 carbon atoms.

Organosilicon compounds containing at least one (cycloalkyl)methylene moiety can also be represented by one or more of Formulae (VI), (VII), (VIII), (IX), and (X):

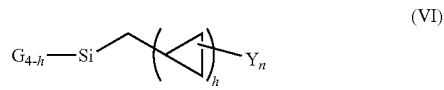

(VI)

(VII)

(VIII)

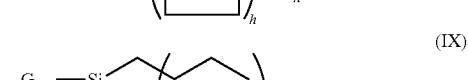

(IX)

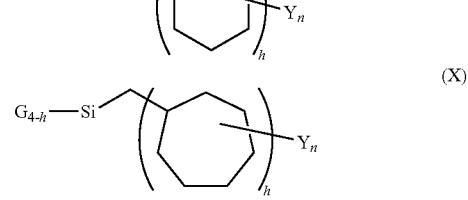

(X)

wherein each G is independently an alkoxy group including methoxy and ethoxy groups or a hydrocarbon group including alkyl groups, such as methyl, ethyl, propyl, butyl, cyclopropyl, cyclopentyl, cyclohexyl, and 2-ethylhexyl groups; h is 1 to 4 or 1 to 2; each Y is independently a hydrocarbon group including those mentioned above, hydroxy, or halogen; and n is 0 to 3, 0 to 2, or 1 to 2.

Additional examples of organosilicon compounds are those of the following Formulae (XI), (XII), (XIII), (XIV), (XV), (XVI), (XVII), (XVIII), (XIX), (XX), (XXI), and (XXII):

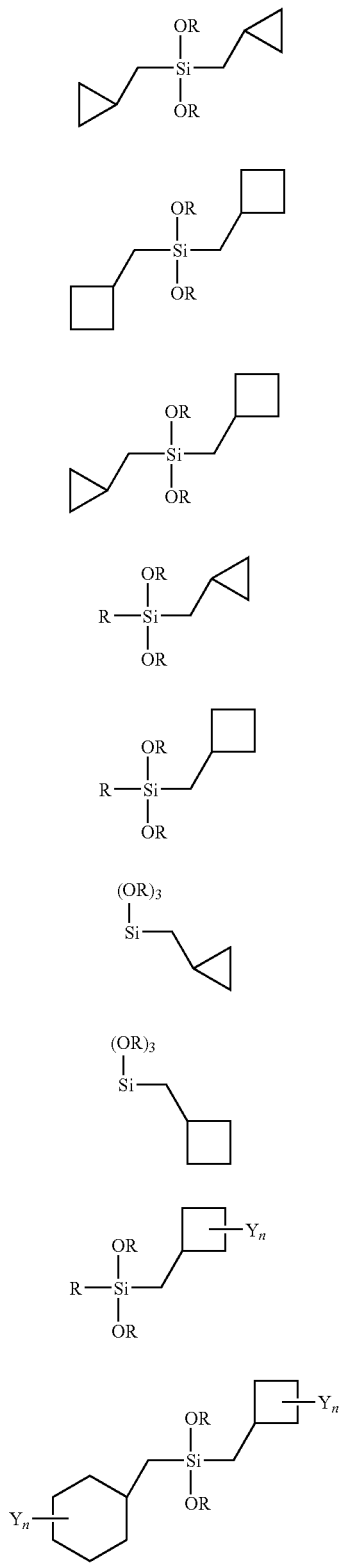

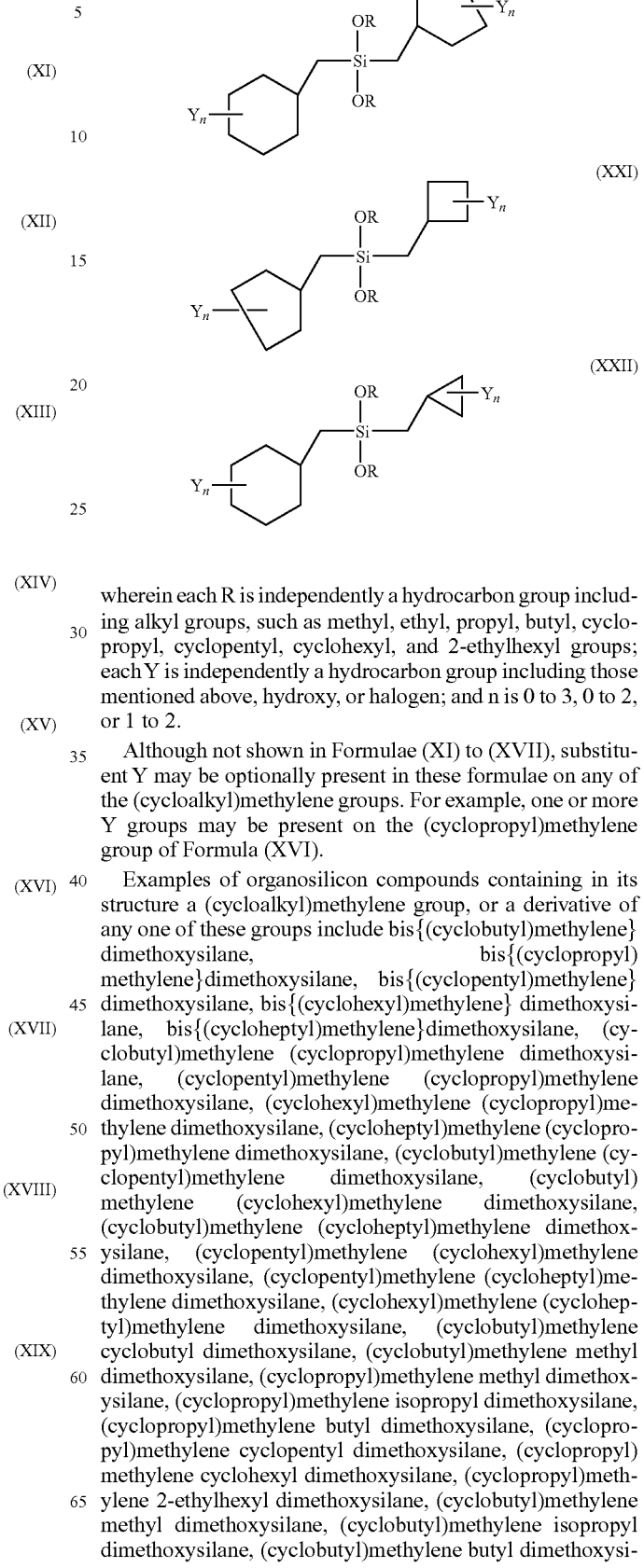

wherein each R is independently a hydrocarbon group including alkyl groups, such as methyl, ethyl, propyl, butyl, cyclopropyl, cyclopentyl, cyclohexyl, and 2-ethylhexyl groups; each Y is independently a hydrocarbon group including those mentioned above, hydroxy, or halogen; and n is 0 to 3, 0 to 2, or 1 to 2.

Although not shown in Formulae (XI) to (XVII), substituent Y may be optionally present in these formulae on any of the (cycloalkyl)methylene groups. For example, one or more Y groups may be present on the (cyclopropyl)methylene group of Formula (XVI).

Examples of organosilicon compounds containing in its structure a (cycloalkyl)methylene group, or a derivative of any one of these groups include bis{(cyclobutyl)methylene} dimethoxysilane, bis{(cyclopropyl) methylene}dimethoxysilane, bis{(cyclopentyl)methylene} dimethoxysilane, bis{(cyclohexyl)methylene} dimethoxysilane, bis{(cycloheptyl)methylene}dimethoxysilane, (cyclobutyl)methylene (cyclopropyl)methylene dimethoxysilane, (cyclopentyl)methylene (cyclopropyl)methylene dimethoxysilane, (cyclohexyl)methylene (cyclopropyl)methylene dimethoxysilane, (cycloheptyl)methylene (cyclopropyl)methylene dimethoxysilane, (cyclobutyl)methylene (cyclopentyl)methylene dimethoxysilane, (cyclobutyl)methylene (cyclohexyl)methylene dimethoxysilane, (cyclobutyl)methylene (cycloheptyl)methylene dimethoxysilane, (cyclopentyl)methylene (cyclohexyl)methylene dimethoxysilane, (cyclopentyl)methylene (cycloheptyl)methylene dimethoxysilane, (cyclohexyl)methylene (cycloheptyl)methylene dimethoxysilane, (cyclobutyl)methylene cyclobutyl dimethoxysilane, (cyclobutyl)methylene methyl dimethoxysilane, (cyclopropyl)methylene methyl dimethoxysilane, (cyclopropyl)methylene isopropyl dimethoxysilane, (cyclopropyl)methylene butyl dimethoxysilane, (cyclopropyl)methylene cyclopentyl dimethoxysilane, (cyclopropyl) methylene cyclohexyl dimethoxysilane, (cyclopropyl)methylene 2-ethylhexyl dimethoxysilane, (cyclobutyl)methylene methyl dimethoxysilane, (cyclobutyl)methylene isopropyl dimethoxysilane, (cyclobutyl)methylene butyl dimethoxysilane, (cyclobutyl)methylene cyclopentyl dimethoxysilane, (cyclobutyl)methylene cyclohexyl dimethoxysilane, (cyclobutyl)methylene 2-ethylhexyl dimethoxysilane, (cyclopentyl)methylene cyclobutyl dimethoxysilane, (cyclopentyl)methylene methyl dimethoxysilane, (cyclohexyl)methylene methyl dimethoxysilane, (cyclohexyl)methylene isopropyl dimethoxysilane, (cyclohexyl)methylene butyl dimethoxysilane, (cyclohexyl)methylene cyclopentyl dimethoxysilane, (cyclohexyl)methylene cyclohexyl dimethoxysilane, (cyclohexyl)methylene 2-ethylhexyl dimethoxysilane, (cyclopentyl)methylene methyl dimethoxysilane, (cyclopentyl)methylene isopropyl dimethoxysilane, (cyclopentyl)methylene butyl dimethoxysilane, (cyclopentyl)methylene cyclopentyl dimethoxysilane, (cyclopentyl)methylene cyclohexyl dimethoxysilane, (cyclopentyl)methylene 2-ethylhexyl dimethoxysilane, (cycloheptyl)methylene cyclobutyl dimethoxysilane, (cycloheptyl)methylene methyl dimethoxysilane, (cycloheptyl)methylene methyl dimethoxysilane, (cycloheptyl)methylene isopropyl dimethoxysilane, (cycloheptyl)methylene butyl dimethoxysilane, (cycloheptyl)methylene cyclopentyl dimethoxysilane, (cycloheptyl)methylene cyclohexyl dimethoxysilane, (cycloheptyl)methylene 2-ethylhexyl dimethoxysilane, (cyclopropyl)methylene trimethoxysilane, (cyclobutyl)methylene trimethoxysilane, (cyclopentyl)methylene trimethoxysilane, (cyclohexyl)methylene trimethoxysilane, (cycloheptyl)methylene trimethoxysilane, bis{(cyclobutyl)methylene} diethoxysilane, bis{(cyclopropyl)methylene}diethoxysilane, bis{(cyclopentyl)methylene} diethoxysilane, bis{(cyclohexyl)methylene} diethoxysilane, bis{(cycloheptyl)methylene}diethoxysilane, (cyclobutyl)methylene (cyclopropyl)methylene diethoxysilane, (cyclopentyl)methylene (cyclopropyl)methylene diethoxysilane, (cyclohexyl)methylene (cyclopropyl)methylene diethoxysilane, (cycloheptyl)methylene (cyclopropyl)methylene diethoxysilane, (cyclobutyl)methylene (cyclopentyl)methylene diethoxysilane, (cyclobutyl)methylene (cyclohexyl)methylene diethoxysilane, (cyclobutyl)methylene (cycloheptyl)methylene diethoxysilane, (cyclopentyl)methylene (cyclohexyl)methylene diethoxysilane, (cyclopentyl)methylene (cycloheptyl)methylene diethoxysilane, (cyclohexyl)methylene (cycloheptyl)methylene diethoxysilane, (cyclobutyl)methylene cyclobutyl diethoxysilane, (cyclobutyl)methylene methyl diethoxysilane, (cyclopropyl)methylene methyl diethoxysilane, (cyclopropyl)methylene isopropyl diethoxysilane, (cyclopropyl)methylene butyl diethoxysilane, (cyclopropyl)methylene cyclopentyl diethoxysilane, (cyclopropyl)methylene cyclohexyl diethoxysilane, (cyclopropyl)methylene 2-ethylhexyl diethoxysilane, (cyclobutyl)methylene methyl diethoxysilane, (cyclobutyl)methylene isopropyl diethoxysilane, (cyclobutyl)methylene butyl diethoxysilane, (cyclobutyl)methylene cyclopentyl diethoxysilane, (cyclobutyl)methylene cyclohexyl diethoxysilane, (cyclobutyl)methylene 2-ethylhexyl diethoxysilane, (cyclopentyl)methylene cyclobutyl diethoxysilane, (cyclopentyl)methylene methyl diethoxysilane, (cyclohexyl)methylene methyl diethoxysilane, (cyclohexyl)methylene isopropyl diethoxysilane, (cyclohexyl)methylene butyl diethoxysilane, (cyclohexyl)methylene cyclopentyl diethoxysilane, (cyclohexyl)methylene cyclohexyl diethoxysilane, (cyclohexyl)methylene 2-ethylhexyl diethoxysilane, (cyclopentyl)methylene methyl diethoxysilane, (cyclopentyl)methylene isopropyl diethoxysilane, (cyclopentyl)methylene butyl diethoxysilane, (cyclopentyl)methylene cyclopentyl diethoxysilane, (cyclopentyl)methylene cyclohexyl diethoxysilane, (cyclopentyl)methylene 2-ethylhexyl diethoxysilane, (cycloheptyl)methylene cyclobutyl diethoxysilane, (cycloheptyl)methylene methyl diethoxysilane, (cycloheptyl)methylene methyl diethoxysilane, (cycloheptyl)methylene isopropyl diethoxysilane, (cycloheptyl)methylene butyl diethoxysilane, (cycloheptyl)methylene cyclopentyl diethoxysilane, (cycloheptyl)methylene cyclohexyl diethoxysilane, (cycloheptyl)methylene 2-ethylhexyl diethoxysilane, (cyclopropyl)methylene triethoxysilane, (cyclobutyl)methylene triethoxysilane, (cyclopentyl)methylene triethoxysilane, (cyclohexyl)methylene triethoxysilane, and (cycloheptyl)methylene triethoxysilane.

In another aspect of the subject innovation, the organosilicon compound is represented by Formula (XXIV)

$$SiR^{21}R_m^{22}(OR^{23})_{3-m} \qquad (XXIV)$$

In the above Formula (XXIV), $0 \leq m \leq 3$, such as $0 \leq m \leq 2$; and $R^{21}$ represents a cyclopropyl group, cyclobutyl group, cyclopentyl group, a cyclopentenyl group, a cyclopentadienyl group, cyclohexyl group, or a derivative of any of these. The derivative may preferably be, for example, a cyclopentyl group substituted by 1 to about 4 alkyl groups having 1 to about 4 carbon atoms, an alkyl group having 2 to about 4 carbon atoms substituted by a cyclopentyl group which may be substituted by 1 to about 4 alkyl groups having 1 to about 4 carbon atoms, a cyclopentenyl group substituted by 1 to about 4 alkyl groups having 1 to about 4 carbon atoms, a cyclopentadienyl group substituted by 1 to about 4 alkyl groups having 1 to about 4 carbon atoms, or an indenyl, indanyl, tetrahydroindenyl or fluorenyl group which may be substituted by 1 to about 4 alkyl groups having 1 to about 4 carbon atoms.

Specific examples of the group $R^{21}$ include cyclopropyl, cyclobutyl, cyclopentyl, 2-methylcyclopentyl, 3-methylcyclopentyl, 2-ethylcyclopentyl, 3-propylcyclopentyl, 3-isopropylcyclopentyl, 3-butylcyclopentyl, 3-tertiary butyl cyclopentyl, 2,2-dimethylcyclopentyl, 2,3-dimethylcyclopentyl, 2,5-dimethylcyclopentyl, 2,2,5-trimethylcyclopentyl, 2,3,4,5-tetramethylcyclopentyl, 2,2,5,5-tetramethylcyclopentyl, 1-cyclopentylpropyl, 1-methyl-1-cyclopentylethyl, cyclopentenyl, 2-cyclopentenyl, 3-cyclopentenyl, 2-methyl-1-cyclopentenyl, 2-methyl-3-cyclopentenyl, 3-methyl-3-cyclopentenyl, 2-ethyl-3-cyclopentenyl, 2,2-dimethyl-3-cyclopentenyl, 2,5-dimethyl-3-cyclopentenyl, 2,3,4,5-tetramethyl-3-cyclopentenyl, 2,2,5,5-tetramethyl-3-cyclopentenyl, 1,3-cyclopentadienyl, 2,4-cyclopentadienyl, 1,4-cyclopentadienyl, 2-methyl-1,3-cyclopentadienyl, 2-methyl-2,4-cyclopentadienyl, 3-methyl-2,4-cyclopentadienyl, 2-ethyl-2,4-cyclopentadienyl, 2-dimethyl-2,4-cyclopentadienyl, 2,3-dimethyl-2,4-cyclopentadienyl, 2,5-dimethyl-2,4-cyclopentadienyl, 2,3,4,5-tetramethyl-2,4-cyclopentadienyl, indenyl, 2-methylindenyl, 2-ethylindenyl, 2-indenyl, 1-methyl-2-indenyl, 1,3-dimethyl-2-indenyl, indanyl, 2-methylindanyl, 2-indanyl, 1,3-dimethyl-2-indanyl, 4,5,6,7-tetrahydroindenyl, 4,5,6,7-tetrahydro-2-indenyl, 4,5,6,7-tetrahydro-1-methyl-2-indenyl, 4,5,6,7-tetrahydro-1,3-dimethyl-2-indenyl, fluorenyl groups, cyclohexyl, methylcyclohexyls, ethylcyclohexyls, propylcyclohexyls, isopropylcyclohexyls, n-butylcyclohexyls, tertiary-butyl cyclohexyls, dimethylcyclohexyls, and trimethylcyclohexyls.

In Formula (XXIV), $R^{22}$ and $R^{23}$ are identical or different and each represents a hydrocarbon. Examples of $R^{22}$ and $R^{23}$ are alkyl, cycloalkyl, aryl and aralkyl groups having 3 or more carbon atoms. Furthermore, $R^{21}$ and $R^{22}$ may be bridged by an alkyl group, etc. General examples of organosilicon compounds are those of Formula (XXIV) in which $R^{21}$ is a cyclopentyl group, $R^{22}$ is an alkyl group such as methyl or a cyclopentyl group, and $R^{23}$ is an alkyl group, particularly a methyl or ethyl group.

Specific examples of organosilicon compounds of Formula (XXIV) include trialkoxysilanes such as cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis(2-methylcyclopentyl)dimethoxysilane, bis(3-tertiary butylcyclopentyl)dimethoxysilane, bis(2,3-dimethylcyclopentyl)dimethoxysilane, bis(2,5-dimethylcyclopentyl)dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyidimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyidimethoxysilane and indenylfluorenyidimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentadienylmethoxysilane and diindenylcyclopentylmethoxysilane; and ethylenebis-cyclopentyldimethoxysilane.

In yet another aspect of the subject innovation, the organosilicon compound is a polyorganosilicon compound containing, as a monomer, any of the organosilicon compounds described above.

The subject innovation further relates to a polymerization process which involves polymerizing or copolymerizing olefins in the presence of the polymerization catalyst system described above. The catalyst system can produce polymer product having a controlled and/or relatively large size and shape. The shape of the resultant polymer product is substantially spherical. In one embodiment, using the catalyst support, catalyst system, and/or methods of the subject innovation, the polymer product has a substantially spherical shape and an average diameter of about 300 microns or more (on a 50% by volume basis). In another embodiment, the polymer product has a substantially spherical shape and an average diameter of about 1,000 microns or more (on a 50% by volume basis). In yet another embodiment, the polymer product has a substantially spherical shape and an average diameter of about 1,500 microns or more (on a 50% by volume basis). The relatively large size of the polymer product permits the polymer product to contain a high amount of rubber without deleteriously affecting flow properties.

Polymerization of olefins in accordance with the subject innovation is carried out in the presence of the catalyst system described above. Generally speaking, olefins are contacted with the catalyst system described above under suitable conditions to form desired polymer products. In one embodiment, preliminary polymerization described below is carried out before the main polymerization. In another embodiment, polymerization is carried out without preliminary polymerization. In yet another embodiment, the formation of impact copolymer is carried out using at least two polymerization zones.

In preliminary polymerization, the solid titanium catalyst component is usually employed in combination with at least a portion of the organoaluminum compound. This may be carried out in the presence of part or the whole of the organosilicon compound (external electron donor).

In preliminary polymerization, the concentration of the solid titanium catalyst component in the preliminary polymerization is usually from about 0.01 to about 200 millimoles, preferably from about 0.05 to about 100 millimoles, calculated as titanium atoms per liter of an inert hydrocarbon medium described below. In one embodiment, the preliminary polymerization is carried out by adding an olefin and the above catalyst system ingredients to an inert hydrocarbon medium and reacting the olefin under mild conditions.

Specific examples of the inert hydrocarbon medium include aliphatic hydrocarbons such as propane, butane, pentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures thereof. In the subject innovation, a liquid olefin may be used in place of part or the whole of the inert hydrocarbon medium.

The olefin used in the preliminary polymerization may be the same as, or different from, an olefin to be used in the main polymerization.

The reaction temperature for the preliminary polymerization is sufficient for the resulting preliminary polymer to not substantially dissolve in the inert hydrocarbon medium. In one embodiment, the temperature is from about −20° C. to about 100° C. In another embodiment, the temperature is from about −10° C. to about 80° C. In yet another embodiment, the temperature is from about 0° C. to about 40° C.

Optionally, a molecular-weight controlling agent, such as hydrogen, may be used in the preliminary polymerization. The molecular weight controlling agent is used in such an amount that the polymer obtained by the preliminary polymerization has an intrinsic viscosity, measured in decalin at 135° C., of at least about 0.2 dl/g, and preferably from about 0.5 to 10 dl/g.

In one embodiment, the preliminary polymerization is desirably carried out so that from about 0.1 g to about 1,000 g of a polymer forms per gram of the titanium catalyst component of the catalyst system. In another embodiment, the preliminary polymerization is desirably carried out so that from about 0.3 g to about 500 g of a polymer forms per gram of the titanium catalyst component. If the amount of the polymer formed by the preliminary polymerization is too large, the efficiency of producing the olefin polymer in the main polymerization may sometimes decrease, and when the resulting olefin polymer is molded into a film or another article, fish eyes tend to occur in the molded article. The preliminary polymerization may be carried out batchwise or continuously.

After the preliminary polymerization conducted as above, or without performing any preliminary polymerization, the main polymerization of an olefin is carried out in the presence of the above-described olefin polymerization catalyst system formed from the solid titanium catalyst component containing an antistatic agent, the organoaluminum compound and the organosilicon compound (external electron donor).

Examples of olefins that can be used in the main polymerization are alpha-olefins having 2 to 20 carbon atoms such as ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane. In the process of the subject innovation, these alpha-olefins may be used individually or in any combination.

In one embodiment, propylene or 1-butene is homopolymerized, or a mixed olefin containing propylene or 1-butene as a main component is copolymerized. When the mixed olefin is used, the proportion of propylene or 1-butene as the main component is usually at least about 50 mole %, preferably at least about 70 mole %.

By performing the preliminary polymerization, the catalyst system in the main polymerization can be adjusted in the degree of activity. This adjustment tends to result in a powdery polymer having a high bulk density. Furthermore, when the preliminary polymerization is carried out, the particle shape of the resulting polymer becomes spherical, and in the case of slurry polymerization, the slurry attains excellent characteristics while in the case of gas phase polymerization, the catalyst bed attains excellent characteristics. Furthermore, in these embodiments, a polymer having a high stereoregularity index can be produced with a high catalytic efficiency by polymerizing an alpha-olefin having at least about 3 carbon atoms. Accordingly, when producing the propylene copolymer, the resulting copolymer powder or the copolymer becomes easy to handle.

In the homopolymerization or copolymerization of these olefins, a polyunsaturated compound such as a conjugated diene or a non-conjugated diene may be used as a comonomer. Examples of comonomers include styrene, butadiene, acrylonitrile, acrylamide, alpha-methyl styrene, chlorostyrene, vinyl toluene, divinyl benzene, diallylphthalate, alkyl methacrylates and alkyl acrylates. In one embodiment, the comonomers include thermoplastic and elastomeric monomers.

In the process of the subject innovation, the main polymerization of an olefin is carried out usually in the gaseous or liquid phase.

In one embodiment, polymerization (main polymerization) employs a catalyst system containing the titanium catalyst component with an antistatic agent in an amount from about 0.001 to about 0.75 millimole calculated as Ti atom per liter of the volume of the polymerization zone, the organoaluminum compound in an amount from about 1 to about 2,000 moles per mole of titanium atoms in the titanium catalyst component, and the organosilicon compound (external donor) in an amount from about 0.001 to about 10 moles calculated as Si atoms in the organosilicon compound per mol of the metal atoms in the organoaluminum compound. In another embodiment, polymerization employs a catalyst system containing the titanium catalyst component with an antistatic agent in an amount from about 0.005 to about 0.5 millimole calculated as Ti atom per liter of the volume of the polymerization zone, the organoaluminum compound in an amount from about 5 to about 500 moles per mole of titanium atoms in the titanium catalyst component, and the organosilicon compound in an amount from about 0.01 to about 2 moles calculated as Si atoms in the organosilicon compound per mol of the metal atoms in the organoaluminum compound. In yet another embodiment, polymerization employs a catalyst system containing the organosilicon compound in an amount from about 0.05 to about 1 mole calculated as Si atoms in the organosilicon compound per mol of the metal atoms in the organoaluminum compound.

When the organoaluminum compound and the organosilicon compound are used partially in the preliminary polymerization, the catalyst system subjected to the preliminary polymerization is used together with the remainder of the catalyst system components. The catalyst system subjected to the preliminary polymerization may contain the preliminary polymerization product.

The use of hydrogen at the time of polymerization promotes and contributes to control of the molecular weight of the resulting polymer, and the polymer obtained may have a high melt flow rate. In this case, the stereoregularity index of the resulting polymer and the activity of the catalyst system are increased according to the methods of the subject innovation.

In one embodiment, the polymerization temperature is from about 20° C. to about 200° C. In another embodiment, the polymerization temperature is from about 50° C. to about 180° C. In one embodiment, the polymerization pressure is typically from about atmospheric pressure to about 100 kg/cm². In another embodiment, the polymerization pressure is typically from about 2 kg/cm² to about 50 kg/cm². The main polymerization may be carried out batchwise, semi-continuously or continuously. The polymerization may also be carried out in two or more stages under different reaction conditions.

The olefin polymer so obtained may be a homopolymer, a random copolymer, a block copolymer or an impact copolymer. The impact copolymer contains an intimate mixture of a polyolefin homopolymer and a polyolefin rubber. Examples of polyolefin rubbers include ethylene propylene rubbers (EPR) such as ethylene propylene methylene copolymer rubber (EPM) and ethylene propylene diene methylene terpolymer rubber (EPDM).

The olefin polymer obtained by using the catalyst system has a very small amount of an amorphous polymer component and therefore a small amount of a hydrocarbon-soluble component. Accordingly, a film molded from this resultant polymer has low surface tackiness.

The polyolefin obtained by the polymerization process is excellent in particle size distribution, particle diameter and bulk density, and the copolyolefin obtained has a narrow composition distribution. In an impact copolymer, excellent fluidity, low temperature resistance, and a desired balance between stiffness and elasticity can be obtained.

In one embodiment, propylene and an alpha-olefin having 2 or from about 4 to about 20 carbon atoms are copolymerized in the presence of the catalyst system described above. The catalyst system may be one subjected to the preliminary polymerization described above. In another embodiment, propylene and an ethylene rubber are formed in two reactors coupled in series to form an impact copolymer.

The alpha-olefin having 2 carbon atoms is ethylene, and examples of the alpha-olefins having about 4 to about 20 carbon atoms are 1-butene, 1-pentene, 4-methyl-1-pentene, 1-octene, 1-hexene, 3-methyl-1-pentene, 3-methyl-1-butene, 1-decene, vinylcyclohexane, 1-tetradecene, and the like.

In the main polymerization, propylene may be copolymerized with two or more such alpha-olefins. For example, it is possible to copolymerize propylene with ethylene and 1-butene. In one embodiment, propylene is copolymerized with ethylene, 1-butene, or ethylene and 1-butene.

Block copolymerization of propylene and another alpha-olefin may be carried out in two stages. The polymerization in a first stage may be the homopolymerization of propylene or the copolymerization of propylene with the other alpha-olefin. In one embodiment, the amount of the monomers polymerized in the first stage is from about 50 to about 95% by weight. In another embodiment, the amount of the monomers polymerized in the first stage is from about 60 to about 90% by weight. In the subject innovation, this first stage polymerization may, as required be carried out in two or more stages under the same or different polymerization conditions.

In one embodiment, the polymerization in a second stage is desirably carried out such that the mole ratio of propylene to the other alpha-olefin(s) is from about 10/90 to about 90/10. In another embodiment, the polymerization in a second stage is desirably carried out such that the mole ratio of propylene to the other alpha-olefin(s) is from about 20/80 to about 80/20. In yet another embodiment, the polymerization in a second stage is desirably carried out such that the mole ratio of propylene to the other alpha-olefin(s) is from about 30/70 to about 70/30. Producing a crystalline polymer or copolymer of another alpha-olefin may be provided in the second polymerization stage.

The propylene copolymer so obtained may be a random copolymer or the above-described block copolymer. This propylene copolymer typically contains from about 7 to about 50 mole % of units derived from the alpha-olefin having 2 or from about 4 to about 20 carbon atoms. In one embodiment, a propylene random copolymer contains from about 7 to about 20 mole % of units derived from the alpha-olefin having 2 or from about 4 to about 20 carbon atoms. In another embodiment, the propylene block copolymer contains from about 10 to about 50 mole % of units derived from the alpha-olefin having 2 or 4-20 carbon atoms.

In another one embodiment, copolymers made with the catalyst system contain from about 50% to about 99% by weight poly-alpha-olefins and from about 1% to about 50% by weight comonomers (such as thermoplastic or elastomeric monomers). In another embodiment, copolymers made with the catalyst system contain from about 75% to about 98% by weight poly-alpha-olefins and from about 2% to about 25% by weight comonomers.

It should be understood that where there is no reference to the polyunsaturated compound that can be used, the method of polymerization, the amount of the catalyst system and the polymerization conditions, the same description as the above embodiments are applicable.

The catalysts/methods of the subject innovation can in some instances lead to the production of poly-alpha-olefins including ICPs having xylene solubles (XS) from about 0.5% to about 10%. In another embodiment, poly-alpha-olefins having xylene solubles (XS) from about 1% to about 6% are produced in accordance with the subject innovation. In yet another embodiment, poly-alpha-olefins having xylene solubles (XS) from about 2% to about 5% are produced in accordance with the subject innovation. XS refers to the percent of solid polymer that dissolves into xylene. A low XS % value generally corresponds to a highly isotactic polymer (i.e., higher crystallinity), whereas a high XS % value generally corresponds to a low isotactic polymer.

In one embodiment, the catalyst efficiency (measured as kilogram of polymer produced per gram of catalyst) of the catalyst system of the subject innovation is at least about 10. In another embodiment, the catalyst efficiency of the catalyst system of the subject innovation is at least about 30. In yet another embodiment, the catalyst efficiency of the catalyst system of the subject innovation is at least about 50.

The catalysts/methods of the subject innovation can in some instances lead to the production of poly-alpha-olefins including ICPs having melt flow indexes (MFI) from about 3 to about 9. For example, in one embodiment, an impact polypropylene-ethylenepropylene rubber product has an MFI from about 4 to about 8. In another embodiment, an impact polypropylene-ethylenepropylene rubber product has an MFI from about 5 to about 7. In some instances a relatively high MFI indicates that a relatively high catalyst efficiency is obtainable. The MFI (flow rate) is measured according to ASTM standard D 1238.

The catalysts/methods of the subject innovation can in some instances lead to the production of poly-alpha-olefins including ICPs having bulk densities (BD) of at least about 0.25 cc/g. For example, in one embodiment, an impact polypropylene-ethylenepropylene rubber product has a BD of at least about 0.35 cc/g. In another embodiment, an impact polypropylene-ethylenepropylene rubber product has a BD of at least about 0.4 cc/g.

The catalysts/methods of the subject innovation lead to the production of poly-alpha-olefins including ICPs having a relatively narrow molecular weight distribution. In one embodiment, the Mw/Mn of a polypropylene polymer made with the subject catalyst system is from about 2 to about 6. In another embodiment, the Mw/Mn of a polypropylene polymer made with the subject catalyst system is from about 3 to about 5.

The following examples illustrate the subject innovation. Unless otherwise indicated in the following examples and elsewhere in the specification and claims, all parts and percentages are by weight, all temperatures are in degrees Centigrade, and pressure is at or near atmospheric pressure.

EXAMPLE 1

Two Ziegler-Natta catalysts were produced substantially according to Example 1 of U.S. Pat. No. 4,861,847. Different phthalates were used as internal donors for the two catalysts.

50 grams of the two catalysts in hexane slurry with solids concentration 20 wt % are placed into 17-4 oz bottles and each sample is mixed with varied amounts of antistatic agents (ASA) of one of three ASAs (the first being ASA-1 bis(2-hydroxyethyl)cocoamine, the second being ASA-2 N,N-Bis (2hydroxy-ethyl) alkylamine, and the third being ASA-3 dinonylnaphthasulfonic acid) as shown in Table 1. The concentration of the ASA is calculated based on total slurry catalyst weight. The prepared samples are rolled for 24 hours. The samples containing the ASA pour easily and do not stick to glass, and the texture is uniform, not clumpy.

1.5 ml of 25% triethyl aluminum is injected into the 3.4 liter reactor at 30° C. which is exclusive of air and moisture by nitrogen purge. 0.6 ml, 0.128 M cyclohexylmethyldimethoxy silane and 10 mg catalyst in mineral oil is charged to reactor. Then 3.5 pound of hydrogen gas is charged into the reactor. Then 1500 ml of liquid propylene is added into the reactor. The polymerization of propylene proceeds for 1 hour at 70° C. At the end of polymerization, the reactor is cooled down to 20° C. The polypropylene is completely dried in a vacuum oven.

The characteristics of polymer product and process of making are summarized in Table 1. CE refers to catalytic efficiency, BD refers to bulk density, MFI refers to melt flow index, XS refers to xylene solubles, D10 refers to an average diameter of polymer product on a 10% by volume basis as determined by a Malvern Instrument, D50 refers to an average diameter of polymer product on a 50% by volume basis as determined by a Malvern Instrument, D90 refers to an average diameter of polymer product on a 90% by volume basis as determined by a Malvern Instrument, and <150 refers to the % by weight of polymer product having an average diameter of less than 150 μm.

TABLE 1

| Sample | ASA | ASA ppm | CE Kg/g | B/D G/cc | MFI G/10 min | XS Wt. % | D10 μm | D50 μm | D90 μm | <150 Wt. % |
|---|---|---|---|---|---|---|---|---|---|---|
| Cat1 | None  | 0   | 37.2 | 0.451 | 4.0 | 2.40 | 440 | 634 | 982  | 0 |
| Cat1 | ASA-3 | 50  | 36.7 | 0.442 | 4.3 | 2.35 | 459 | 657 | 1001 | 0 |
| Cat1 | ASA-3 | 100 | 36.6 | 0.446 | 4.1 | 2.28 | 458 | 648 | 975  | 0 |
| Cat1 | ASA-3 | 200 | 37.3 | 0.446 | 4.1 | 2.21 | 439 | 615 | 895  | 0 |
| Cat1 | ASA-3 | 300 | 35.9 | 0.458 | 4.2 | 2.28 | 455 | 641 | 965  | 0 |
| Cat1 | ASA-3 | 500 | 36.5 | 0.449 | 5.3 | 2.37 | 458 | 645 | 975  | 0 |
| Cat1 | ASA-3 | 750 | 33.0 | 0.443 | 5.1 | 2.40 | 505 | 680 | 966  | 0 |
| Cat1 | ASA-2 | 100 | 37.3 | 0.450 | 4.5 | 2.23 | 482 | 647 | 944  | 0 |
| Cat1 | ASA-2 | 200 | 36.5 | 0.457 | 4.1 | 2.41 | 460 | 621 | 905  | 0 |
| Cat1 | ASA-2 | 500 | 36.9 | 0.429 | 5.3 | 2.68 | 494 | 664 | 947  | 0 |
| Cat1 | ASA-2 | 750 | 34.2 | 0.446 | 5.4 | 2.54 | 475 | 654 | 966  | 0 |
| Cat1 | ASA-1 | 500 | 37.5 | 0.444 | 5.5 | 2.67 | 469 | 638 | 926  | 0 |
| Cat2 | None  | 0   | 47.5 | 0.433 | 5.4 | 3.11 | 511 | 757 | 1157 | 0 |
| Cat2 | ASA-2 | 500 | 45.0 | 0.434 | 5.4 | 3.06 | 526 | 771 | 1168 | 0 |
| Cat2 | ASA-2 | 750 | 41.1 | 0.434 | 5.2 | 2.90 | 504 | 741 | 1141 | 0 |
| Cat2 | ASA-3 | 500 | 44.7 | 0.442 | 5.2 | 2.94 | 508 | 731 | 1123 | 0 |
| Cat2 | ASA-1 | 500 | 46.5 | 0.429 | 5.6 | 2.95 | 500 | 733 | 1080 | 0 |

There is no reduction on catalyst activity with ASA up to 300 ppm with either catalyst used. Polymerization tests with the ASA concentration at 500 ppm result in substantial reduction of activity. When concentration is increased to 750 ppm, both catalysts give reduced activity.

EXAMPLE 2

Brief description of the operation of the commercial gas phase plant.

A gas phase process consists of a 75 m³ reactor with a stirrer used to maintain a homogenous mixture in the bed. The heat of polymerization is removed by condensing the heated reactor hydrocarbon gas by means of a condenser which is recycled into the reactor. The dry solid titanium catalyst containing 78 ppm of ASA was diluted in a slurry to 11 wt % prior to being fed to the reactor. Triethylaluminum was used as the co-catalyst and Cyclohexylmethyldimethoxysilane was used as the external electron donor. The Al/Ti mole ratio [mole ratio of the triethylaluminum to Titanium] was 140. The Si/Ti mole ratio [mole ratio of Cyclohexylmethyldimethoxysilane to Titanium] was 11.1. The temperature and pressure of the polymerization are contained in Table 2

Preparation of the ZN catalyst containing 78 ppm of an ASA mixture of polybutene sulfate, aminoethanolepichlorohydrin polymer, and alkylbenzenesulfonic acid. A Ziegler-Natta catalyst was produced using the same method as Example 1. 2 cylinders of the hexane slurry catalyst were transferred to a catalyst dryer where a mixture of 0.59 grams of polybutene sulfate, about 0.127 grams of aminoethanolepichlorohydrin polymer, 0.55 grams of alkylbenzenesulfonic acid in 2.96 grams of toluene were added to 54.25 kg of solid titanium catalyst. The catalyst slurry was dried until the hydrocarbon volatiles equaled 12 wt %. The dry catalyst was packaged into a drums containing 35.13 kg and 16.4 kg. Since the catalyst drying temperature was lower than the boiling point of the ASA mixture, the ASA concentration is calculated at 78 ppm based on the solid titanium catalyst. The catalyst drum containing 35.13 kg of solid titanium catalyst was used for this example.

In a commercial gas phase plant a copolymer, [propylene & ethylene monomers], production run fed the ZN catalyst containing 78 ppm of the ASA mixture [based on catalyst weight] which enabled agglomerate free production of a random copolymer containing 0.5% to 0.7% ethylene. The operating conditions [Al/Ti, Si/Ti, H2/C3, C2/C3] were set based on settings used in previous runs during this production run. In the past, the production rate of this copolymer had been limited due to agglomerate formation in the reactor. The formation of polymer agglomerates is typically caused by high localized temperatures in the reactor due to poor catalyst dispersion. Improved dispersion of the catalyst, by using a solid titanium catalyst containing the ASA, reduces the localized temperature by giving the heat removal medium better access to the individual catalyst particles.

No agglomerates were produced during this 16 hour production run using the ZN catalyst with the ASA. By improving the individual catalyst particle dispersion prior to feeding the catalyst into the reactor, polymer agglomerate formation was prevented. The resulting concentration of the ASA in the polymer is approximately 4.2 ppb. This level of the ASA will have no effect on the polymer properties. Table 2 below is a summary of this 16 hour production run.

TABLE 2

| Time Hour | Production Rate MT/h | Reaction Pressure Kg/cm² | Reaction Temperature ° C. | Powder BD g/cc | Agglomerates >1 mm Wt in 100 grams |
|---|---|---|---|---|---|
| 1  | 23.2 | 30.1 | 80.0 | 0.45 | 0 |
| 5  | 23.2 | 30.9 | 81.3 | 0.45 | 0 |
| 10 | 23.9 | 30.1 | 79.2 | 0.45 | 0 |
| 15 | 22.6 | 29.5 | 79.9 | 0.45 | 0 |

EXAMPLE 3

The catalyst system is the same as Example 2 except the catalyst contains 85 ppm of dinonylnaphthasulfonic acid. A copolymer of ethylene and propylene is produced in the same manner as Example 2. The reactor was operated for 60 hours and the production increased up to 27 MT/h which is 22% higher than previously obtained without the formation of agglomerates or increased fines. Table 3 below is a summary of the first 24 hours of the entire 60 hour production run

TABLE 3

| Time Hour | Production Rate MT/h | Reaction Pressure Kg/cm² | Reaction Temperature ° C. | Powder BD g/cc | Agglomerates >1 mm Wt in 100 grams |
|---|---|---|---|---|---|
| 1 | 23.9 | 31.1 | 80.7 | 0.45 | 0 |
| 6 | 25 | 30.5 | 80.3 | 0.45 | 0 |
| 12 | 23.5 | 31.7 | 80.1 | 0.45 | 0 |
| 18 | 24.2 | 30.6 | 79.8 | 0.45 | 0 |
| 24 | 24.8 | 29.9 | 79.7 | 0.45 | 0 |

While the innovation is explained in relation to certain embodiments, it is to be understood that various modifications thereof will become apparent to those skilled in the art upon reading the specification. Therefore, it is to be understood that the innovation disclosed herein is intended to cover such modifications as fall within the scope of the appended claims.

What is claimed is:

1. A catalyst system for polymerizing an olefin, comprising:
    a solid titanium catalyst component having a substantially spherical shape and a diameter from about 3 microns to about 150 microns (on a 50% by volume basis), the solid titanium catalyst component comprising a titanium compound and a support made from a magnesium compound and an alkyl silicate;
    from about 5 ppm to about 3000 ppm of an antistatic agent based on the weight of the catalyst system;
    optionally an organoaluminum compound having at least one aluminum-carbon bond; and
    optionally an organosilicon compound.

2. The catalyst system of claim 1, wherein the catalyst system comprises from about 20 ppm to about 400 ppm of the antistatic agent.

3. The catalyst system of claim 1, wherein the catalyst system comprises from about 700 ppm to about 1000 ppm of the antistatic agent.

4. The catalyst system of claim 1, wherein the catalyst system is in a slurry form or in a dry form.

5. The catalyst system of claim 1, wherein the antistatic agent comprises at least one selected from a group consisting of fatty acid esters, mono-hydroxy or poly-hydroxy alcohols, amines, amides, polyoxyalkylenic compounds, ethylene oxide/propylene oxide copolymers, aminic soaps, aminic salts of alkyl-sulfates, quaternary ammonium compounds, alkyl-phosphates, an alkyphenol compound, and aminic salts of alkylphosphonic acids.

6. The catalyst system of claim 1, wherein the antistatic agent comprises at least one selected from a group consisting of polyoxyethylene amines, hydroxylethyl alkylamines, ethoxylated tertiary alkylamines, and fatty acid dialkanolamines.

7. The catalyst system of claim 1, wherein the antistatic agent comprises N,N-Bis(2-hydroxy-ethyl) alkylamine.

8. The catalyst system of claim 1, wherein the antistatic agent comprises hydroxylethyl alkylamines.

9. A method of making a catalyst system used for the production of a polyolefin, comprising:
    contacting a magnesium compound and an alkyl silicate in a liquid medium to form a mixture;
    heating the mixture to form a substantially spherical catalyst support having a diameter from about 3 microns to about 150 microns (on a 50% by volume basis);
    contacting the substantially spherical catalyst support with a titanium compound; and
    combining an antistatic agent with the substantially spherical catalyst support, wherein the amount of the antistatic agent is from about 5 ppm to about 3000 ppm based on the weight of the catalyst system.

10. The method of claim 9, wherein the antistatic agent is combined with the substantially spherical catalyst support in a slurry form or in a dry form.

11. The method claim 9, wherein the antistatic agent is combined with the substantially spherical catalyst support so that the catalyst system comprises from about 5 ppm to about 3000 ppm of the antistatic agent based on the weight of the catalyst system.

12. The method of claim 9, wherein the antistatic agent is combined with the substantially spherical catalyst support so that the catalyst system comprises from about 20 ppm to about 400 ppm of the antistatic agent based on the weight of the catalyst system.

13. The method claim 9, wherein the antistatic agent comprises at least one selected from a group consisting of fatty acid esters, mono-hydroxy or poly-hydroxy alcohols, amines, amides, polyoxyalkylenic compounds, ethylene oxide/propylene oxide copolymers, aminic soaps, aminic salts of alkyl-sulfates, quaternary ammonium compounds, alkyl-phosphates, an alkyphenol compound, and aminic salts of alkylphosphonic acids.

14. The method of claim 9, wherein the antistatic agent comprises at least one selected from a group consisting of polyoxyethylene amines, hydroxylethyl alkylamines, ethoxylated tertiary alkylamines, and fatty acid dialkanolamines.

15. The method of claim 9 further comprising combining an organoaluminum compound having at least one aluminum-carbon bond and an organosilicon compound with the substantially spherical catalyst support.

16. A method of making a polyolefin, comprising:
    contacting an olefin with a catalyst system comprising a solid titanium catalyst component having a substantially spherical shape and a diameter from about 3 microns to about 150 microns (on a 50% by volume basis), the solid titanium catalyst component comprising a titanium compound and a support made from a magnesium compound and an alkyl silicate; from about 5 ppm to about 3000 ppm of an antistatic agent based on the weight of the catalyst system; optionally an organoaluminum compound having at least one aluminum-carbon bond; and optionally an organosilicon compound, to provide the polyolefin.

17. The method of claim 16, wherein the antistatic agent comprises at least one selected from a group consisting of fatty acid esters, mono-hydroxy or poly-hydroxy alcohols, amines, amides, polyoxyalkylenic compounds, ethylene oxide/propylene oxide copolymers, aminic soaps, aminic salts of alkyl-sulfates, quaternary ammonium compounds, alkyl-phosphates, an alkyphenol compound, and aminic salts of alkylphosphonic acids.

18. The method of claim 16, wherein the antistatic agent comprises at least one selected from a group consisting of polyoxyethylene amines, hydroxylethyl alkylamines, ethoxylated tertiary alkylamines, and fatty acid dialkanolamines.

19. The method of claim 16, wherein the catalyst system comprises from about 20 ppm to about 400 ppm of an antistatic agent.

20. The method of claim 16, wherein the catalyst system comprises from about 25 ppm to about 1000 ppm of an antistatic agent.

* * * * *